US010771536B2

(12) United States Patent
Pitio et al.

(10) Patent No.: US 10,771,536 B2
(45) Date of Patent: *Sep. 8, 2020

(54) COORDINATED PROCESSING OF DATA BY NETWORKED COMPUTING RESOURCES

(71) Applicant: ROYAL BANK OF CANADA, Montreal (CA)

(72) Inventors: Walter Michael Pitio, Morganville, NJ (US); Philip Iannaccone, New York, NY (US); Daniel Aisen, New York, NY (US); Bradley Katsuyama, New York, NY (US); Robert Park, New York, NY (US); John Schwall, New York, NY (US); Richard Steiner, Wyckoff, NJ (US); Allen Zhang, Princeton, NJ (US); Thomas L. Popejoy, New York, NY (US); Gregory Martin Ludvik, New York, NY (US); Thomas Matthew Clark, New York, NY (US); Xiaoran Zheng, New York, NY (US)

(73) Assignee: ROYAL BANK OF CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,530

(22) Filed: Apr. 30, 2019

(65) Prior Publication Data

US 2019/0260824 A1 Aug. 22, 2019

Related U.S. Application Data

(63) Continuation-in-part of application No. 16/042,323, filed on Jul. 23, 2018, now Pat. No. 10,623,478, (Continued)

(51) Int. Cl.
*G06F 15/173* (2006.01)
*H04L 29/08* (2006.01)
(Continued)

(52) U.S. Cl.
CPC ............ *H04L 67/10* (2013.01); *G06Q 40/04* (2013.01); *H04L 43/0852* (2013.01); (Continued)

(58) Field of Classification Search
CPC ... H04L 67/10; H04L 67/325; H04L 43/0852; H04L 43/0858; H04L 43/0864; G06Q 40/04
(Continued)

(56) References Cited

U.S. PATENT DOCUMENTS 6,434,590 B1 * 8/2002 Blelloch .............. G06F 9/5066 718/102
6,677,858 B1 * 1/2004 Faris ..................... G06Q 30/06 340/573.1
(Continued)

*Primary Examiner* — Thu Ha T Nguyen
(74) *Attorney, Agent, or Firm* — Norton Rose Fulbright Canada LLP

(57) ABSTRACT

Systems, methods, and computer-readable media for coordinating processing of data by multiple networked computing resources include monitoring data associated with a plurality of networked computing resources, and coordinating the routing of data processing segments to the networked computing resources.

29 Claims, 18 Drawing Sheets

Related U.S. Application Data which is a continuation of application No. 15/055,130, filed on Feb. 26, 2016, now Pat. No. 10,057,333, which is a continuation-in-part of application No. 12/796,139, filed on Jun. 8, 2010.

(60) Provisional application No. 62/664,913, filed on Apr. 30, 2018, provisional application No. 62/126,106, filed on Feb. 27, 2015, provisional application No. 62/126,120, filed on Feb. 27, 2015, provisional application No. 62/132,063, filed on Mar. 12, 2015, provisional application No. 61/285,375, filed on Dec. 10, 2009.

(51) Int. Cl.

| | |
|---|---|
| ***G06Q 40/04*** | (2012.01) |
| ***H04L 12/26*** | (2006.01) |
| ***H04L 12/841*** | (2013.01) |

(52) U.S. Cl.
CPC .......... *H04L 47/283* (2013.01); *H04L 67/325* (2013.01); *H04L 43/0858* (2013.01); *H04L 43/0864* (2013.01)

(58) Field of Classification Search
USPC .................................................. 709/201, 203
See application file for complete search history.

(56) References Cited

U.S. PATENT DOCUMENTS 6,721,765 B2 * 4/2004 Ghosh ................. G06F 16/2358
6,856,970 B1 * 2/2005 Campbell .............. G06Q 40/00 705/35
7,143,392 B2 * 11/2006 Ii .......................... G06F 11/323 717/125
7,171,479 B2 * 1/2007 Buchanan ............... H04L 29/06 709/228
7,277,861 B1 * 10/2007 Benson .................. G06Q 40/00 705/38
7,318,083 B2 * 1/2008 Senda ................ H04N 1/00206 709/203
7,401,159 B1 * 7/2008 Aviani ................ H04L 67/1008 370/230.1
7,412,623 B1 * 8/2008 Lindberg ............ G06F 11/3414 714/33
7,447,775 B1 * 11/2008 Zhu .................. H04N 21/23439 709/217
7,502,912 B2 * 3/2009 Sodani .................. G06F 9/3836 712/214
7,617,159 B1 * 11/2009 Donner .................. G06Q 10/02 705/67
7,617,274 B2 * 11/2009 Coughlin .......... H04L 29/12066 370/252
7,627,658 B2 * 12/2009 Levett ...................... G06F 9/46 709/203
7,630,986 B1 * 12/2009 Herz ...................... G06Q 10/10
7,755,621 B2 * 7/2010 Kripac .................... G06T 17/20 345/420
7,778,919 B2 * 8/2010 Waelbroeck ....... G06Q 30/0251 705/37
7,822,065 B2 * 10/2010 Lu ........................ H04W 88/02 370/328
7,840,482 B2 * 11/2010 Singla .................... G06Q 40/06 705/36 R
7,890,735 B2 * 2/2011 Tran ...................... G06F 9/3822 712/215
7,970,891 B1 * 6/2011 Kontothanssis ....... G06Q 30/02 709/224
8,036,664 B2 * 10/2011 Khetawat ............. H04W 24/02 370/216
8,069,138 B2 * 11/2011 Tully .................... G06Q 40/00 705/35
8,073,428 B2 * 12/2011 Khetawat ............. H04W 16/16 455/411
8,127,001 B1 * 2/2012 Sylvain .................. G06Q 50/22 709/224
8,204,502 B2 * 6/2012 Khetawat ................ H04W 8/04 455/436
8,307,119 B2 * 11/2012 Rochelle ............... G06F 17/246 709/248
8,336,051 B2 * 12/2012 Gokulakannan ............................ G06F 16/24532 718/101
8,392,314 B1 * 3/2013 Epstein .................. G06Q 40/04 705/35
8,682,777 B1 * 3/2014 Epstein .................. G06Q 40/04 705/35
8,825,830 B2 * 9/2014 Newton .............. H04L 41/0893 709/223
10,013,986 B1 * 7/2018 Bhaya ..................... G06F 3/167
10,236,006 B1 * 3/2019 Gurijala .................. G10L 19/02
10,310,928 B1 * 6/2019 Hegar ................. H04L 43/0823
10,560,215 B1 * 2/2020 Hegar ................ H04N 1/00007
10,567,213 B1 * 2/2020 Braverman ............. G06F 9/505
2002/0026321 A1 * 2/2002 Faris ....................... A63F 13/12 705/1.1
2004/0030611 A1 * 2/2004 Byrne .................. G06Q 10/087 705/26.2
2005/0050386 A1 * 3/2005 Reinhardt ........... G06F 11/1482 714/13
2006/0047591 A1 * 3/2006 Snouffer ................ G06Q 40/00 705/35
2007/0226135 A1 * 9/2007 Yamada ................. G06Q 20/10 705/39
2007/0240160 A1 * 10/2007 Paterson-Jones ..... G06F 9/5055 718/104
2008/0294332 A1 * 11/2008 Levanon ............ G01C 21/3638 701/532
2009/0171950 A1 * 7/2009 Lunenfeld .......... G06Q 30/0256
2009/0172200 A1 * 7/2009 Morrison ............. G10H 1/0058 709/248
2011/0264577 A1 * 10/2011 Winbom ................ G06Q 40/04 705/37
2012/0089496 A1 * 4/2012 Taylor .................... G06Q 40/04 705/35
2012/0136986 A1 * 5/2012 Nader ................. G06F 11/0757 709/224
2019/0108004 A1 * 4/2019 Kavanagh ............... G06F 8/443
2019/0108247 A1 * 4/2019 Kavanagh ........... G06F 11/3072
2019/0114537 A1 * 4/2019 Wesolowski ............. G06N 3/08
2019/0260824 A1 * 8/2019 Pitio ..................... H04L 67/325
2019/0347081 A1 * 11/2019 Kavanagh ........... G06F 11/3409

* cited by examiner 630 94% Fill rate 106,1106

| LEVEL 1 - 94% Fill Rate | | | | SCR@.01 | Trade-ex |
|---|---|---|---|---|---|
| Sold | 549,200 | $ 4.21 | EDGA | $ 5,492 | $ 110 |
| Sold | 339,100 | $ 4.21 | NQBX | $ 3,391 | $ 34 |
| Sold | 32,700 | $ 4.21 | CBOE | $ 327 | $ (33) |
| Sold | 1,105,600 | $ 4.21 | NYSE | $ 11,056 | $ (1,990) |
| Sold | 537,800 | $ 4.21 | BATS | $ 5,378 | $ (1,345) |
| Sold | 959,100 | $ 4.21 | ARCA | $ 9,591 | $ (2,590) |
| Sold | 554,900 | $ 4.21 | EDGX | $ 5,549 | $ (1,554) |
| Sold | 645,100 | $ 4.21 | NSDQ | $ 6,451 | $ (1,935) |
| LEVEL 2 - Completed | | | | | |
| Sold | 276,500 | $ 4.20 | ARCA | $ 2,765 | $ (747) |
| **TOTAL** | **5,000,000** | **4.2094** | | **$ 50,000** | **$ (10,049)** |

624 624, 626 636 632

FIG. 6A 630 47% Fill rate ** 106,1106

| LEVEL 1 - 47% Fill Rate | | | | SCR@.01 | Trade-ex |
|---|---|---|---|---|---|
| Sold | 549,200 | $ 4.21 | EDGA | $ 5,492 | $ 110 |
| Sold | 339,100 | $ 4.21 | NQBX | $ 3,391 | $ 34 |
| Sold | 32,700 | $ 4.21 | CBOE | $ 327 | $ (33) |
| Sold | 1,105,600 | $ 4.21 | NYSE | $ 11,056 | $ (1,990) |
| Sold | 348,000 | $ 4.21 | BATS | $ 3,480 | $ (870) |
| LEVEL 2 - 43% Fill Rate | | | | | |
| Sold | 217,200 | $ 4.20 | EDGA | $ 2,172 | $ 43 |
| Sold | 163,900 | $ 4.20 | NQBX | $ 1,639 | $ 16 |
| Sold | 653,000 | $ 4.20 | CBOE | $ 6,530 | $ (653) |
| Sold | 120,100 | $ 4.20 | NYSE | $ 1,201 | $ (216) |
| Sold | 453,100 | $ 4.20 | BATS | $ 4,531 | $ (1,133) |
| Sold | 560,000 | $ 4.20 | ARCA | $ 5,600 | $ (1,512) |
| LEVEL 3 - Completed | | | | | |
| Sold | 134,600 | $ 4.19 | EDGA | $ 1,346 | $ 27 |
| Sold | 51,700 | $ 4.19 | NQBX | $ 517 | $ 5 |
| Sold | 271,800 | $ 4.19 | BATS | $ 2,718 | $ (272) |
| **TOTAL** | **5,000,000** | **4.2038** | | **$ 50,000** | **$ (6,443)** |

| Fills using conventional methods and systems | | | | | Consolidated Tape | | |
|---|---|---|---|---|---|---|---|
| Sold | 2,374,600 | $ | 4.21 | | 2,374,600 | $ | 4.21 |
| Sold | 2,167,300 | $ | 4.20 | | 4,659,695 | $ | 4.20 |
| Sold | 458,100 | $ | 4.19 | | 984,915 | $ | 4.19 |
| **Totals** | **5,000,000** | $ | **4.2038** | | **8,019,210** | $ | **4.2017** |
| **Outperformance vs. Avg. Price Benchmark** | | | | | | | **0.0021** |
| Fills using example of disclosed method and system | | | | | Consolidated Tape | | |
| Sold | 4,700,000 | $ | 4.21 | | 5,000,000 | $ | 4.21 |
| Sold | 300,000 | $ | 4.20 | | 3,019,210 | $ | 4.20 |
| **Totals** | **5,000,000** | $ | **4.2094** | | **8,019,210** | $ | **4.2062** |
| **Outperformance vs. Avg. Price Benchmark** | | | | | | | **0.0032** |

Monitor data associated with networked computing resources
810

Receive instructions for execution of data process(es)
820

Prepare data processing segment(s)
830

Determine timing parameters for data processing segment(s)
840

Initiate routing of data processing segments
850

| | Latency in microseconds | Msg Rate per second | Msg Interval in microseconds |
|---|---|---|---|
| Venue 1 | 0 | 2000 | 500 |
| Venue 2 | 200 | 2000 | 500 |
| Venue 3 | 400 | 5000 | 200 |
| Venue 4 | 600 | 1000 | 1000 |
| Venue 5 | 900 | 1250 | 800 |

FIG. 10

| | Wave A – Symbol X | Wave B – Symbol X | Wave C – Symbol Y | Wave D – Symbol Z |
|---|---|---|---|---|
| Venue 1 | 0 | - | - | - |
| Venue 2 | +200 | 0 | - | - |
| Venue 3 | +400 | - | - | 0 |
| Venue 4 | +600 | +400 | 0 | - |
| Venue 5 | - | +700 | +300 | +500 |

FIG. 11A

| | Venue Msg Interval | Wave A – Symbol X | Wave B – Symbol X | Wave C – Symbol Y | Wave D – Symbol Z |
|---|---|---|---|---|---|
| Venue 1 | 500 | 0 (0, 0) | - | - | - |
| Venue 2 | 500 | 200 (200, 0) | 610 (700, 0) | - | - |
| Venue 3 | 200 | 400 (400, 0) | - | - | 1630 (1630, 0) |
| Venue 4 | 1000 | 600 (600, 0) | 1010 (1600, +500) | 1320 (2600, 0) | - |
| Venue 5 | 800 | - | 1310 (1310, -90) | 1620 (2110, -790) | 2130 (2910, +780) |

FIG. 11B

| | Venue Msg Interval | Wave A – Symbol X | Wave B – Symbol X | Wave C – Symbol Y | Wave D – Symbol Z |
|---|---|---|---|---|---|
| Venue 1 | 500 | 0 (0, 0) | - | - | - |
| Venue 2 | 500 | 200 (200, 0) | 610 (700, 0) | - | - |
| Venue 3 | 200 | 400 (400, 0) | - | - | 410 (600, 0) |
| Venue 4 | 1000 | 600 (600, 0) | 1010 (2600, +1300) | 610 (1600, 0) | - |
| Venue 5 | 800 | - | 1310 (2510, +1110) | 910 (910, -390) | 920 (1710, +510) |

FIG. 11C

| | Venue Msg Interval | Wave A – Symbol X | Wave B – Symbol X | Wave C – Symbol Y | Wave D – Symbol Z |
|---|---|---|---|---|---|
| Venue 1 | 500 | 0 (0, 0) | - | - | - |
| Venue 2 | 500 | 200 (200, 0) | 1200 (1200, 0) | - | - |
| Venue 3 | 200 | 400 (400, 0) | - | - | 3200 (3200, 0) |
| Venue 4 | 1000 | 600 (600, 0) | 1600 (1600, 0) | 2600 (2600, 0) | - |
| Venue 5 | 800 | - | 1900 (1900, 0) | 2900 (2900, 0) | 3700 (3700, 0) |

FIG. 11D

| | Venue Msg Interval | Wave C – Symbol Y | Wave D – Symbol Z | Wave A – Symbol X | Wave B – Symbol X |
|---|---|---|---|---|---|
| Venue 1 | 500 | - | - | 400 (400, 0) | - |
| Venue 2 | 500 | - | - | 600 (600, 0) | 1600 (1600, 0) |
| Venue 3 | 200 | - | 600 (600, 0) | 800 (800, 0) | - |
| Venue 4 | 1000 | 0 (0, 0) | - | 1000 (1000, 0) | 2000 (2000, 0) |
| Venue 5 | 800 | 300 (300, 0) | 1100 (1100, 0) | - | 2300 (2300, 0) |

FIG. 11E

COORDINATED PROCESSING OF DATA BY NETWORKED COMPUTING RESOURCES

CROSS-REFERENCE TO RELATED APPLICATIONS

This application is claims all benefit including priority to U.S. Provisional Patent Application 62/664,913, filed Apr. 30, 2018, and entitled "COORDINATED PROCESSING OF DATA BY NETWORKED COMPUTING RESOURCES".

The application is also a continuation-in-part of U.S. patent application Ser. No. 16/042,323, filed Jul. 23, 2018; which is a continuation of U.S. patent application Ser. No. 15/055,130, filed Feb. 26, 2016.

U.S. patent application Ser. No. 15/055,130 is a non-provisional of and claims all benefit including priority to:

U.S. Provisional Patent Application No. 62/126,106, filed Feb. 27, 2015, and entitled COORDINATED PROCESSING OF DATA BY NETWORKED COMPUTING RESOURCES;

U.S. Provisional Application No. 62/126,120, filed Feb. 27, 2015, and entitled COORDINATED PROCESSING OF DATA BY NETWORKED COMPUTING RESOURCES; and U.S. Provisional Application No. 62/132,063, filed Mar. 12, 2015, and entitled COORDINATED PROCESSING OF DATA BY NETWORKED COMPUTING RESOURCES.

U.S. patent application Ser. No. 15/055,130 is also a continuation-in-part of U.S. patent application Ser. No. 14/796,139, filed Jun. 8, 2010, and entitled SYNCHRONIZED PROCESSING OF DATA BY NETWORKED COMPUTING RESOURCES; which claims the benefit of U.S. Provisional Patent Application No. 61/285,375, filed Dec. 10, 2009, and entitled SYNCHRONIZED PROCESSING OF DATA BY NETWORKED COMPUTING RESOURCES.

All of the above-noted applications are hereby incorporated by reference in their entireties.

TECHNICAL FIELD

The present disclosure relates generally to systems, methods, devices and computer-readable media for the management of data processing by multiple networked computing resources. In particular, the disclosure relates to the coordination or synchronization of related or temporal requests for processing of data at distributed network resources.

Aspects of the material disclosed in this application may underlie or relate to the holding, transfer, and/or administration of securities and other financial interests. Aspects of such holding, transfer, and/or administration may be subject to regulation by governmental and other agencies. The disclosure herein is made solely in terms of logical, programming, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

BACKGROUND

In various forms of networked or otherwise distributed data processing systems, complex and/or multiple related processes are often routed to multiple computing resources for execution. For example, in financial and other trading systems, orders for purchases, sales, and other transactions in financial interests are often routed to multiple market or exchange servers for fulfillment. For example, when a large order is routed to multiple exchanges (e.g., based on the liquidity available in each market), orders tend to arrive at the faster exchanges (i.e., those having fewer inherent latencies) before they arrive at slower exchanges (i.e., those having greater inherent latencies), and thus show in the books of different exchanges at different times. When orders begin to show on the books of the faster exchanges, other parties can detect the orders and attempt to take advantage of the latency in slower exchanges by cancelling, changing, and or otherwise manipulating quotes (e.g., bids and offers) or other market parameters on the slower exchanges, effectively increasing the implicit trading costs. As a result, orders that may have otherwise executed on any single exchange at a high fill ratio tend to exhibit a lower overall fill ratio when routed to multiple exchanges as a split trade.

Prior art documents, such as the Rony Kay article "Pragmatic Network Latency Engineering, Fundamental Facts and Analysis, have attempted to address such problems by proposing elimination of one-way communications (i.e., "packet") latencies. Such systems fail to address arbitrage opportunities and other issues caused or facilitated by variations in the time required for multiple processors to execute individual portions of multiple-processor execution requests (i.e., execution latencies), in addition to (or as part of) communications latencies.

SUMMARY

In various aspects the present disclosure provides systems, methods, and computer-executable instruction mechanisms (e.g., non-transient machine-readable programming structures) such as software-coded instruction sets and data, for the management of data processing by multiple networked computing resources. In particular, for example, the present disclosure provides systems, methods, and media useful in controlling the synchronization or coordination of related requests for processing of data using distributed network resources.

For example, in one aspect the present disclosure provides systems, methods, and media for coordinating processing of data by multiple networked computing resources. Such systems, for example, can include at least one processor configured to: receive from one or more data sources signals representing instructions for execution of at least one data process executable by a plurality of networked computing resources; divide the at least one data process into a plurality of data processing segments, each data processing segment to be routed to a different one of a plurality of networked execution processors; based at least partly on latencies in execution of prior data processing requests routed by the system to each of the plurality of networked execution processors, determine a plurality of timing parameters, each of the plurality of timing parameters to be associated with a corresponding one of the plurality of data processing segments, the plurality of timing parameters determined to cause synchronized execution of the plurality of data processing segments by the plurality of networked execution processors; route the plurality of data processing segments to the plurality of corresponding networked execution processors in a timing sequence based on the timing parameters; determining a capture ratio for the data processing segments;

and adjusting the timing parameters associated with each of the plurality of networked execution processors based on the capture ratio.

In some aspects the present disclosure provides systems, methods, and programming or other machine-interpretable instructions for causing synchronized/coordinated processing of data by multiple networked computing resources, such systems, for example, comprising at least one processor configured to execute machine-interpretable instructions and causing the system to: monitor execution of signal processing execution requests by each of the plurality of networked computing resources; determine at least one timing parameter associated with a latency in execution of signal processes between the system and each of the plurality of networked computing resources; and store the at least one timing parameter in machine-readable memory accessible by the at least one processor.

Monitoring of execution of signal processing execution requests according to such and other embodiments of the invention can be implemented on continual, periodic, and/or other suitable or desirable bases.

In various embodiments of the various aspects of the invention, the networked computing resources can include one or more exchange servers. The data sources can include one or more broker or trader systems or servers, the controlled signal processes can represent trades in financial interests, and the execution of signal processing execution requests represents the execution of transactions in financial interests, including for example stocks, bonds, options and contract interests, currencies and/or other intangible interests, and/or commodities. In such embodiments requests for execution of data processing procedures can be based wholly or partially on parameters including, for example, any one or more of current market data quotations, order routing rules, order characteristics, displayed liquidity of each networked computing resource, and a probable delay, or latency, in execution of an order quantity at each networked computing resource.

In the same and further aspects the invention provides systems for controlling or otherwise managing requests for processing of data by distributed computer resources, such systems including one or more processors configured to execute instructions for causing the system to: monitor execution of signal processing execution requests by each of the plurality of networked computing resources; determine at least one timing parameter associated with the latency in execution of signal processes between the system and each of the plurality of networked computing resources; and store the at least one timing parameter for each of the plurality of networked computing resources.

In accordance with one aspect, there is provided a system for coordinating processing of data by multiple networked computing resources. The system includes at least one processor configured to: monitor data associated with a plurality of networked computing resources, the monitored data including data associated with data processing segments previously routed to the plurality of networked computing resources; receive from one or more data sources signals representing instructions for execution of at least one data process executable by the plurality of networked computing resources; based on the monitored data: divide the at least one data process into at least one data processing segment, each data processing segment to be routed to one of the plurality of networked computing resources; determine a plurality of timing parameters, each of the plurality of timing parameters to be associated with a corresponding one of the plurality of networked computing resources, the plurality of timing parameters determined to cause synchronized execution of the at least one data processing segment by the plurality of networked computing processors; and route the at least one data processing segment to the plurality of corresponding networked computing processors in a timing sequence based on the timing parameters.

In accordance with another aspect there is provided a method for coordinating processing of data by multiple networked computing resources. The method includes: monitoring data associated with a plurality of networked computing resources, the monitored data including data associated with data processing segments previously routed to the plurality of networked computing resources; receiving from one or more data sources signals representing instructions for execution of at least one data process executable by the plurality of networked computing resources; based on the monitored data: dividing the at least one data process into at least one data processing segment, each data processing segment to be routed to one of the plurality of networked computing resources; determining a plurality of timing parameters, each of the plurality of timing parameters to be associated with a corresponding one of the plurality of networked computing resources, the plurality of timing parameters determined to cause synchronized execution of the at least one data processing segment by the plurality of networked computing processors; and routing the at least one data processing segment to the plurality of corresponding networked computing processors in a timing sequence based on the timing parameters.

In accordance with another aspect there is provided a computer-readable medium or media having stored thereon instructions which when executed by at least one processor, configured the at least one processor to: monitor data associated with a plurality of networked computing resources, the monitored data including data associated with data processing segments previously routed to the plurality of networked computing resources; receive from one or more data sources signals representing instructions for execution of at least one data process executable by the plurality of networked computing resources; based on the monitored data: divide the at least one data process into at least one data processing segment, each data processing segment to be routed to one of the plurality of networked computing resources; determine a plurality of timing parameters, each of the plurality of timing parameters to be associated with a corresponding one of the plurality of networked computing resources, the plurality of timing parameters determined to cause synchronized execution of the at least one data processing segment by the plurality of networked computing processors; and route the at least one data processing segment to the plurality of corresponding networked computing processors in a timing sequence based on the timing parameters.

In accordance with another aspect there is provided: a system for coordinating processing of data by multiple networked computing resources. The system includes at least one processor configured to: obtain a plurality of data processing waves, each data processing wave identifying: one or more data processing segments, one or more networked corresponding computing resources to which the one or more data processing segments are to be routed; and a timing sequence in which the one or more data processing segments are to be routed; obtain a minimum handling interval for each of the networked computing resources; schedule an order for routing the plurality of data processing waves based on the wave timing sequences and the minimum handling intervals for the networked computing resources; and route each of the data processing segments in the plurality of data processing waves based on the order.

In accordance with another aspect, there is provided: a method for coordinating processing of data by multiple networked computing resources, the method comprising: obtaining a plurality of data processing waves, each data processing wave identifying: one or more data processing segments, one or more networked corresponding computing resources to which the one or more data processing segments are to be routed; and a timing sequence in which the one or more data processing segments are to be routed; obtaining a minimum handling interval for each of the networked computing resources; scheduling an order for routing the plurality of data processing waves based on the wave timing sequences and the minimum handling intervals for the networked computing resources; and routing each of the data processing segments in the plurality of data processing waves based on the order.

In accordance with another aspect, there is provided: a computer-readable medium or media having stored thereon instructions which when executed by at least one processor, configure the at least one processor to: obtain a plurality of data processing waves, each data processing wave identifying: one or more data processing segments, one or more networked corresponding computing resources to which the one or more data processing segments are to be routed; and a timing sequence in which the one or more data processing segments are to be routed; obtain a minimum handling interval for each of the networked computing resources; schedule an order for routing the plurality of data processing waves based on the wave timing sequences and the minimum handling intervals for the networked computing resources; and route each of the data processing segments in the plurality of data processing waves based on the order.

In accordance with another aspect, there is provided: a system for coordinating processing of data by multiple networked computing resources, the system comprising at least one processor configured to: receive from one or more data sources signals representing instructions for execution of a plurality of data processes executable by a plurality of networked computing resources, the data processes representing a proposed trade in a financial interest; obtaining data associated with available liquidity of the financial interest at each of the plurality of networked computing resources; divide each of the plurality of data processes into a plurality of data processing segments, each data processing segment divided from a single data process to be routed to at least one of the plurality of networked computing processors; based at least partly on latencies in execution of prior data processing requests routed by the system to each of the plurality of networked computing processors and the available liquidity at each of the plurality of networked computing processors, determine a plurality of timing parameters, each of the plurality of timing parameters to be associated with a corresponding one of the plurality of data processing segments, the plurality of timing parameters determined to cause synchronized execution of the plurality of data processing segments by the plurality of networked computing processors; based on the timing parameters and networked computing processors associated with each of the plurality of data processes, determine a timing sequence for routing the data processing segments for all of the plurality of data processes; and route the plurality of data processing segments to the plurality of corresponding networked computing processors based on the timing sequence.

In accordance with another aspect, there is provided a method for coordinating processing of data by multiple networked computing resources, the method: receiving from one or more data sources signals representing instructions for execution of a plurality of data processes executable by a plurality of networked computing resources, the data processes representing a proposed trade in a financial interest; obtaining data associated with available liquidity of the financial interest at each of the plurality of networked computing resources; dividing each of the plurality of data processes into a plurality of data processing segments, each data processing segment divided from a single data process to be routed to at least one of the plurality of networked computing processors; based at least partly on latencies in execution of prior data processing requests routed by the system to each of the plurality of networked computing processors and the available liquidity at each of the plurality of networked computing processors, determining a plurality of timing parameters, each of the plurality of timing parameters to be associated with a corresponding one of the plurality of data processing segments, the plurality of timing parameters determined to cause synchronized execution of the plurality of data processing segments by the plurality of networked computing processors; based on the timing parameters and networked computing processors associated with each of the plurality of data processes, determining a timing sequence for routing the data processing segments for all of the plurality of data processes; and routing the plurality of data processing segments to the plurality of corresponding networked computing processors based on the timing sequence.

In accordance with another aspect, there is provided a computer-readable medium or media having stored thereon instructions which when executed by at least one processor, configure the at least one processor to: receive from one or more data sources signals representing instructions for execution of a plurality of data processes executable by a plurality of networked computing resources, the data processes representing a proposed trade in a financial interest; obtaining data associated with available liquidity of the financial interest at each of the plurality of networked computing resources; divide each of the plurality of data processes into a plurality of data processing segments, each data processing segment divided from a single data process to be routed to at least one of the plurality of networked computing processors; based at least partly on latencies in execution of prior data processing requests routed by the system to each of the plurality of networked computing processors and the available liquidity at each of the plurality of networked computing processors, determine a plurality of timing parameters, each of the plurality of timing parameters to be associated with a corresponding one of the plurality of data processing segments, the plurality of timing parameters determined to cause synchronized execution of the plurality of data processing segments by the plurality of networked computing processors; based on the timing parameters and networked computing processors associated with each of the plurality of data processes, determine a timing sequence for routing the data processing segments for all of the plurality of data processes; and route the plurality of data processing segments to the plurality of corresponding networked computing processors based on the timing sequence.

In accordance with one another aspect, there is provided: a system, method and/or computer-readable medium for coordinating processing of data by multiple networked computing resources. The system includes at least one processor configured to: receive from one or more data sources signals representing instructions for execution of at least one data process executable by a plurality of networked computing resources, the at least one data process representing at least one proposed trade in a financial interest; obtain data providing an indication of available market resources at each of the plurality of networked computing resources, the available market resources for satisfying requirements for execution of at least a portion of the at least one data process. Based on the data providing the indication of available market resources, the system is configured to divide the at least one data process into a plurality of data processing segments, each data processing segment to be routed to at least one of the plurality of networked computing resources; determine a plurality of timing parameters, each of the plurality of timing parameters to be associated with a corresponding one of the plurality of data processing segments, the plurality of timing parameters determined to cause synchronized execution of the plurality of data processing segments by the plurality of networked computing resources; based on the timing parameters and networked computing processors associated with each of the plurality of data processes, determine a timing sequence for routing the data processing segments for all of the plurality of data processes; and route the plurality of data processing segments to the plurality of corresponding networked computing resources based on the timing sequence.

As will be appreciated by those skilled in the relevant arts, once they have been made familiar with this disclosure, coordination or synchronization of execution of distributed data processing requests by, for example, synchronized or coordinated transmission of requests for such processing, has a great many possible applications in a large number of data processing fields.

BRIEF DESCRIPTION OF THE DRAWINGS

Reference will now be made to the drawings, which show by way of example embodiments of the present disclosure.

FIGS. 6A and 6B show a comparison of fill ratios using an example method and system for processing of data by multiple networked computing resources versus using a conventional method and system.

FIG. 7 illustrates the use of an example metric for comparing an example method and system for processing of data by multiple networked computing resources versus results of using a prior art method and system.

FIG. 10 shows a table illustrating example data associated with networked computing resources.

FIG. 11A, 11B, 11C, 11D, 11E show example schedules for routing data processing segments in data processing waves.

Throughout the appended drawings, like features are identified by like reference numerals.

DESCRIPTION OF EXAMPLE EMBODIMENTS

Figure 1A:
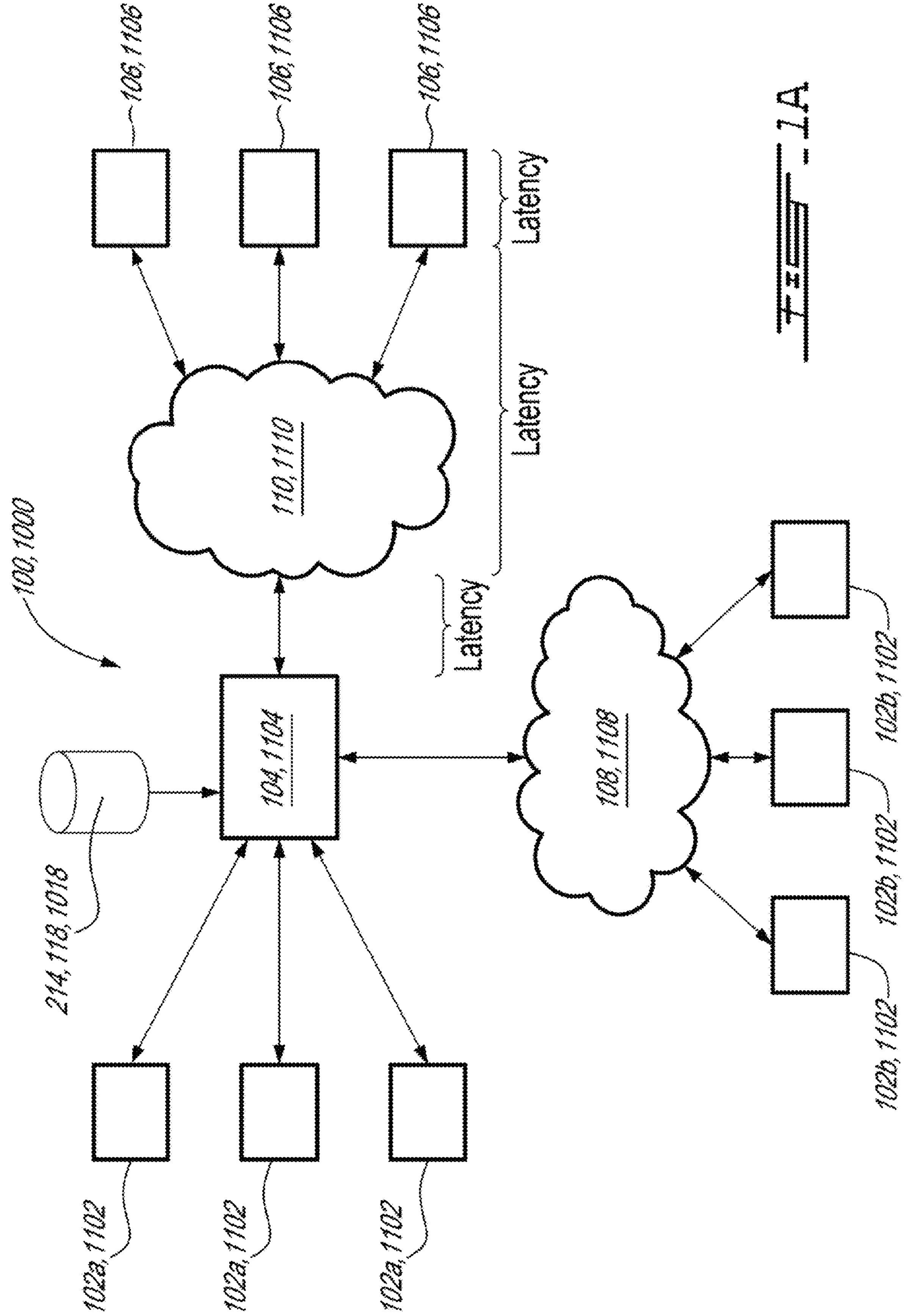
FIGS. 1A, 1B, 1C, 3 and 9 show examples of systems suitable for causing processing of data by multiple networked computing resources in accordance with various aspects of the invention.

In this disclosure, as will be understood by those skilled in the relevant arts, 'synchronized' or 'coordinated' can mean according to any desired timing sequence, whether regular, irregular, and/or wholly or partially simultaneous.

FIG. 1 shows an example of a system 100 suitable for coordinating processing of data by multiple networked computing resources in accordance with the invention.

In the example shown, system 100 includes one or more signal or data sources 102 (comprising one or more each of sources 102*a*, 102*b*), execution router processor(s) 104, and one or more networked computing resources, or execution processors, 106. In some embodiments, data sources 102 may include one or more internal data sources 102*a*, which may communicate with the router 104 directly (e.g., through private local- or wide area network(s) or other secure wireless or wireline communication, through direct communication channel(s) or through communication(s) within a single server). In the same and/or other embodiments, data source(s) 102 may also include one or more external data sources 102*b*, which may for example communicate with router processor(s) 104 via one or more public networks 108 (e.g., a public or private telecommunications network such as the internet), using suitable or otherwise desired network security devices, which may for example include data encryption, etc. In the example shown, router processor(s) 104 communicate with each of the one or more networked execution, or computing, resources 106 via a network 110, which may be the same as or different than network(s) 108.

In various embodiments, data source(s) 102 may include devices that provide, on behalf of one or more entities that generate trading and/or other data processing requests, signals that communicate data and/or instructions related to execution of data processing processes to router processor(s) 104, which data and/or instructions the router processor(s) 104 may process (e.g., aggregate by summing, averaging, etc.; and/or divide into segments, etc.) and use as bases for requests for processing of data by the networked computing resources 106. Data sources 102*a*, 102*b* may include, for example, systems, servers, processors and/or any other suitable source(s) of requests for execution of data processing tasks such as offers and/or bids for purchase of commodities, intangible financial interests, etc., and/or other data processing tasks, such as word, image, and/or other communications or document processing tasks. Each or any of data source(s) 102, processor(s) 104, and resources 106 may include multiple such systems, servers or processors.

In various embodiments, some or all of data source(s) 102 and router processor(s) 104 may be combined, and/or otherwise configured to implement multiple programming or other machine instruction applications running on single machines.

Networked computing resources 106 may include any devices or other resources that communicate with router processor(s) 104 to receive and carry out any of a very wide variety of data processing requests. Such networked computing resources 106 may include systems, servers, processors or any other suitable devices adapted for execution of any processes suitable for use in implementing the invention, including, for example, processing of offers or bids for purchase of commodities, financial interests, etc., and/or other data processing tasks, such as word or document processing, image, and/or other communications or documentation tasks.

In various embodiments, the one or more data sources 102 transmit or otherwise provide to or for the router processor(s) 104 signals representing instructions, or requests, for executing data processing functions. Instructions from any given data source(s) 102 may include instructions for signal processes to be executed by any one or more networked computing resources 106. Requested signal processes may include, for example, computing operations, data manipulations, and/or communications processes or other signal exchanges, among others. In some but not necessarily all examples, such instructions may specifically identify networked computing resource(s) 106 particularly targeted for execution of such processes.

Router processor(s) 104 may parse instruction signals received from one or more source(s) 102 and use such signals to prepare instructions, or requests, to be forwarded to pluralities of execution processors 106, for execution of data processing and/or other signal processes in accordance with the received instructions. Parsing of such instructions may include, for example, identifying the type of process(es) to be requested, including for example the volume or quantity of an order or bid for a trade or an amount of document processing to be done, and the type, nature, and/or identity(ies) of networked computing resource(s) 106 to be requested to execute, and thereby associated with, a given data processing and/or other signal processing request.

For example, in order to increase the efficiency of signal and/or other data processing functions, router processor(s) 104 may parse, sort, and aggregate instructions or requests received from multiple sources 102 for relatively smaller execution requests into one or more larger requests for processing, and further divide such aggregated request(s) into pluralities of smaller requests to be distributed to plurality(ies) of execution processors 106, depending, for example, on the current ability of the execution processors 106 to satisfy or complete such processed requests.

For example, multiple instruction signal sets received from different data sources 102*a*, 102*b* may be associated with (e.g., addressed for delivery to and execution by) individual networked computing resource(s) 106, and such instructions may be aggregated into single signal process execution requests for such networked computing resource(s) 106. In some examples, identification of the networked computing resource(s) 106 to be tasked with a given signal processing request may be performed after the aggregating. For example, multiple instructions from different data sources 102*a*, 102*b* may be sorted or otherwise associated with a single signal or data process, and such instructions may be aggregated, and the aggregated instructions may be associated with one or more identified networked computing resource(s) 106, such that one or more signal process requests may be accordingly prepared for the identified networked computing resource(s) 106. Such parsing, sorting, and/or identification may be performed according to predetermined rules or algorithms (e.g., based on continuing or current processing capabilities of one or more specific networked computing resource(s) 106), and according to requirements encoded in the instructions or otherwise provided by the originating source(s) 102, where relevant.

As a further example, single instruction sets for processing of data may be broken down by processor(s) 104 and distributed to a plurality of resources 106 for distributed execution. For example, a relatively large order for trading in one or more financial interests originating from a single source 102*a*, 102*b*, might need to be distributed to multiple exchange servers 106 in order to be completely filled; in such cases request(s) from one or more source(s) 102 may be broken down by processor(s) 104 into suitable orders for execution by a plurality of such resources 106.

In some embodiments, the instruction sets may be received as parts of various order waves from one or more brokers. These order waves may contain instruction sets, which may be targeted to be transmitted to various venues for trading in one or more financial interests.

Targeted, or specifically identified, networked computing resources/execution processors 106 communicate with the router processor(s) 104 to receive the segmented signal process execution requests and may thereafter execute them accordingly. Execution of such signal processes may include, for example, carrying out a text- or image-processing operation, a mathematical computation, or a communications signal exchange, among others.

As will be readily understood by those skilled in the relevant arts, various components of system 100 may combined, or may be implemented in the form of separate systems or devices. In a wide variety of configurations, such combined or separate (sub)systems may be operated by the same or distinct entities. As a particular example, one or more request source(s) 102 may be integrated with, or otherwise associated with, individual router(s) 104.

In some embodiments, the system may provide one or more intelligent order routers 104 including one or more processors that may be configured for the sequenced, prioritized, scheduled, staggered, segmentation, and/or grouped routing of orders or other data processing segments/requests related to one or more financial interests.

Figure 1B:
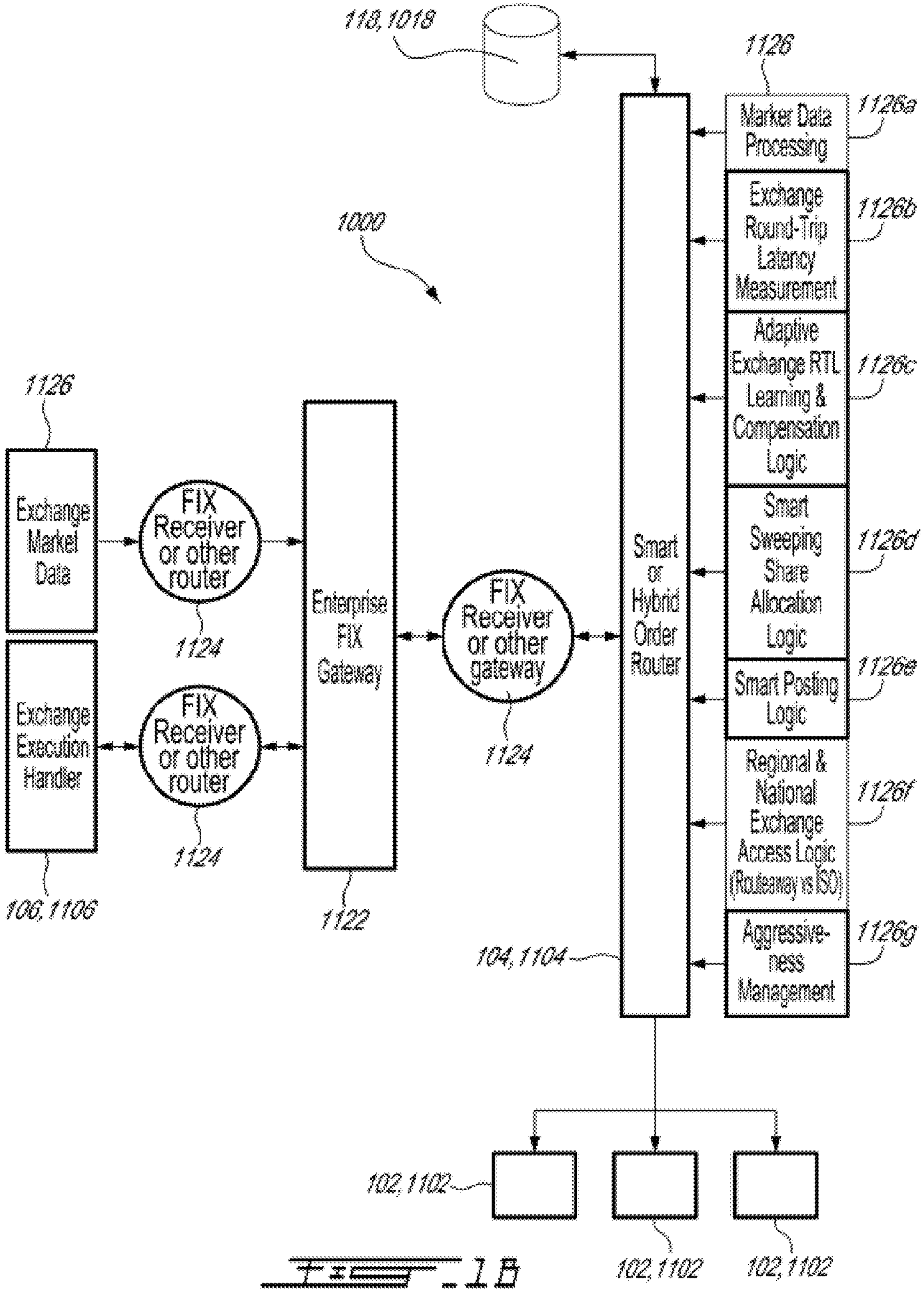
Figure 1C:
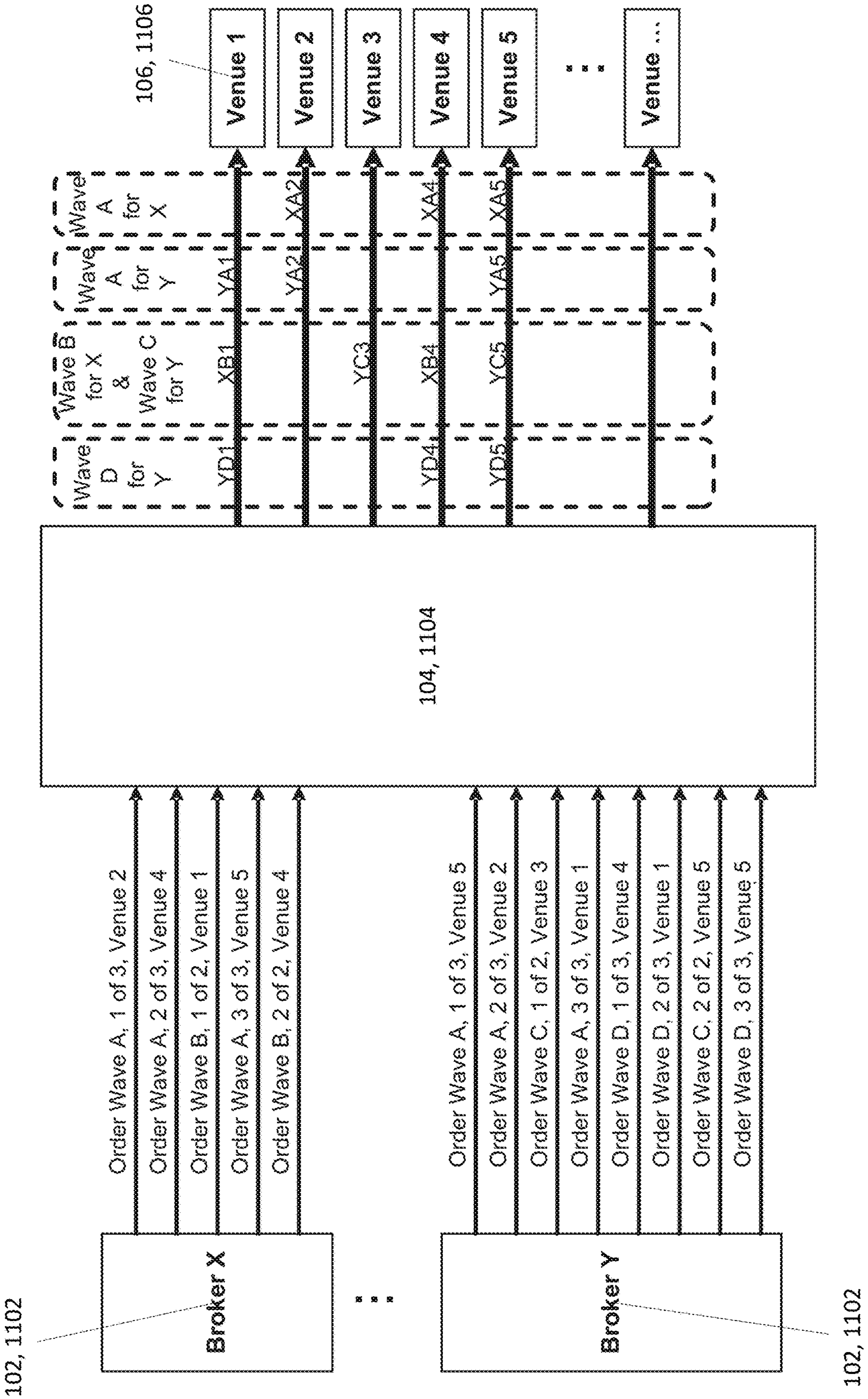

For example, data processing segments may be grouped in waves, and the routing of the individual segments may be scheduled, staggered, grouped, etc., based on the monitored data associated with destination networked computing resources. In some embodiments, the data processing segments may be routed such that the orders arrive at, are processed by, and/or are executed at one or more networked computing resources within a timeframe defined at least in part on the monitored data. FIG. 1C provides a sample schematic diagram depicting a number of example waves of data processing segments being submitted by Brokers X and Y to Venues 1-5, using router processor(s) 104.

In some embodiments, multiple instances of a data processing request may be routed to multiple exchanges with different quantities, conveyed in a determined timing sequence. The timing sequence may be based on timing parameters determined from the monitored data, and may define a timed order in which the initiation of the routing of the data processing segments should be performed.

In routing orders, the system may be configured for the determination of timing parameters, which may include the determination of timing ranges, distributions, etc. The timing parameters may be variable, adaptive, weighted, probabilistic, etc., and may also be tunable depending on various factors, such as network congestion, order load, order priority, venue characteristics, etc.

In some embodiments, the system may be configured to adapt the routing of orders (data processing segments) based on predicted order flow. For example, the system may have a large number of scheduled orders to be routed at a particular time or during a particular timeframe. Accordingly, the system may be configured to adapt the routing of one or more orders given predicted loads on networking equipment, communication channels, venue systems, routing pathways, intermediary network equipment, etc. The system may be further configured to distribute the routing of orders across various network links and/or across different timeframes in order to load-balance the routing of orders.

As described herein, the system monitors data associated with one or more networked computing resources. This data can be acquired with or received from with one or more components or devices in the system.

The system may also be configured for monitoring network data associated with one or more networked computing resources, including monitoring of network performance, monitoring of available network links, among others. Probabilistic distributions and/or models of network performance may be generated, adapted, defined and/or employed in relation to network monitoring. Network monitoring may be utilized for adapting time parameters, etc. Network monitoring may include the determination and/or monitoring of, for example, latency means, maximums, standard deviation, kurtosis, L-kurtosis, skewing, medians, variance, mode, correlations, cross-correlations, covariance, etc., and may be correlated and/or associated with other factors, such as order load, time of day (e.g., the opening of trading, the closing of trading), the occurrence of financial events (e.g., stop trade orders, corporate events, publications of statistics, publication of analyst reports, credit rating changes), the occurrence of network events (e.g., sunspots, denial of service attacks).

Network monitoring may occur, for example, through the tracking of network performance through 'heartbeats' (e.g., the transmission of ping signals, regularly scheduled transmissions, echo request packets) to measure the transmission time of signals, historical order routing performance, recent order routing flow, the sending of test messages, etc.

In some embodiments, test messages are utilized for network monitoring and the difference in timing between test messages and routed order messages may be utilized in determining various order routing characteristics, such as time required to process an order, internal latency within a venue, etc.

In some embodiments, the system utilizes various network prediction techniques in determining order load across various network links, at various venues, etc., including orders scheduled to be routed by the system itself. Execution requests may be rearranged and/or scheduled based in part on the predicted load.

In some embodiments, the system can access database(s) or may receive or monitor network messages to obtain information regarding the topology of one or more network connection(s) as well as the redundancy scheme. For example, the system may have two or more connections and/or routes to a venue. By accessing and monitoring the performance of these connections and/or routes, when a primary connection/route fails, upon detection, the system can be configured to route all subsequent orders based on latencies associated with a known secondary route/connection so as to minimize undesired timings and likely fill rates caused by the failure.

In some embodiments, when available, network monitoring can be performed on previously routed trade requests.

The system may also be configured for the tracking of the trade capture ratio, which may be determined by ratio between the sum of order liquidity as determined at a time (e.g., when a trade decision is made) and the amount of liquidity that was captured in a trade.

The trade capture ratio may be utilized for various purposes, such as adapting timing parameters, determining that a network component has failed, detecting that third parties may be intercepting orders, etc. For example, a high trade capture ratio may be indicative of reduced information leakage and/or increased fill rate, and a low trade capture ratio may be indicative of increased information leakage and/or a decreased fill rate. A low trade capture ratio may, for example, trigger an alert, a notification, adaption by the system through the application of business logic, implementation of timing parameters, modified routing strategies, etc.

In some embodiments, the system may include business logic that may be utilized in determining how orders, routing instructions, etc., may be sequenced, prioritized, scheduled, staggered, segmentation, and/or grouped. The business logic may also be utilized for route selection, route determination, route prioritization, etc. The business logic may also be utilized for decision support. In some embodiments, the business logic may be utilized to prioritize orders based on various business rules, such as rules configured to prioritize venues having order books containing larger amounts of liquidity for a particular financial security, etc.

In some embodiments, the business logic may include intelligent decision support capabilities, such as the ability to traverse decision trees, etc.

In some examples, the system may access, receive or determine (based on monitored network and order performance) information regarding different venues. In some examples, this information may include an estimate of the message handling capabilities of venue(s). As illustrated herein, if order falls into a venue queue or processing capabilities of venue(s) are overloaded, the resulting processing delay may affect the effectiveness of timing parameters and may reduce the control the system has on limiting latency arbitrage. Accordingly, in some examples, the system can be configured to use timing parameters to avoid venue queuing or overloading.

In some examples, venue information can include physical locations of venues, distances between venues (optical cable distances or transmission times), known or likely presence of a co-located predatory trader, effectiveness or speed of the co-located trader, etc. In some examples, one or more of these factors can be used to determine timing parameters. For example, if an order wave involves a venue with a known, effective co-located trader, the timing parameters may be determined based on a lower timing tolerance/differential. In some examples, routing trades with the highest timing tolerance will occur when the trades are routed in a timing sequence resulting in simultaneous arrival or execution. In some instances, having simultaneous arrival/execution may not be optimal for changing markets, so the processor(s) may be configured to consider different tradeoffs.

The system may be configured to take into consideration the potential for third parties to impact the fulfillment of transactions and/or trades in financial securities. For example, a high-frequency trader may utilize information relating to a first order at a first venue to determine that a second order will take place at a second venue. The high-frequency trader may then make an opportunistic trade prior to the arrival of the second order, potentially impacting the price and/or quantity available to the second order. As a result, the second order may not be fulfilled or be fulfilled at a lower quantity, impacting trade capture and fill rate. As a second example, a high-frequency trader may utilize information relating to a first order at a first venue in cancelling an order at a second venue and replacing the order with a higher priced order, in anticipation of the arrival of a second order by the entity placing the first order. As a third example, a high-frequency trader may utilize information relating to a first order at a first venue in determining order information (e.g., such as the National Best Bid and Offer) that may be more up to date than the order information available at one or more venues. The high-frequency trader may then utilize this information to place opportunistic orders that cause the execution of transactions where prices and/or quantities may be suboptimal to counterparties to their orders. For example, mispriced orders being left on order books, etc.

The system may be implemented at various components of a trading network. For example, the system may be implemented at as part of broker electronic systems; as part of a network; as an intermediary gateway and message delivery service; as part of venue electronic systems, etc.

For example, if the system is implemented as an intermediary gateway and message delivery service, the system may be configured to receive from one or more brokers a plurality of orders, which may be associated with one or more order waves to one or more venues. The intermediary gateway and message delivery service may then coordinate the routing, clustering and/or segmentation of the orders and/or suborders to the one or more venues. For example, a broker may 'give-up' an order and route an order on the broker's behalf.

In some embodiments, the system is implemented at a broker level. For example, a broker may utilize the system for the routing of client orders. In some embodiments, the system is implemented at a client level. For example, a client may utilize the system for the routing of its own orders.

The system may be configured for the routing of a large number of orders, and may be designed to for scaling based on the volume of orders. Accordingly, the system may be implemented using various suitable technologies. In some embodiments, the system is a software based solution. In some embodiments, the system is an appliance based solution. In some embodiments, the system is a combination of both software and an appliance based solution. Scalability may be important as the system may need to be able to handle a large number of waves from multiple brokers simultaneously.

In some embodiments, the system is implemented using distributed networking technologies, for example, cloud computing techniques. A potential advantage to using distributed networking technologies includes the ability to provision resources to support various instances of the systems based on order routing volumes. Resiliency and/or high availability technologies, such as failover systems, managed backups, hot/cold backup schemes may also be utilized to achieve a consistent level of service and/or uptime. For example, there may be various instances of the system that may be configured to share information among each other, which may allow for the re-establishment of lossless sessions to clients and venues in the event of a failure.

Some embodiments of the system may provide various benefits, such as increased trade capture rate, increased fill rates, reduced information leakage to third parties, reduced risk of 'moving the market', improved decision making (e.g., achieving a more optimal trade-off between order liquidity and the risk of information leakage), the ability to utilize timing information from various sources, the ability to utilize adaptive and/or probabilistic latency models, the ability to quickly and effectively determine failures in a network or on network equipment, etc.

Where the system is implemented as an intermediary gateway and message delivery service, there may be potential benefits as there is no/reduced integration required at a venue-level and/or a broker-level, and a broker may be able to utilize the system with reduced need for investment into infrastructure, there may be the ability to operate the system independently of brokers, financial institutions, clients, and/or venues. In some embodiments, existing infrastructure, messaging protocols, networks, etc., may be utilized in conjunction with the system. A reduced need for integration and/or adaptation, as well as ease of interoperation with existing standards and/or protocols may be commercially valuable in view of regulatory requirements, resiliency requirements, security requirements, and the potential expense and/or complexity required for system modifications. The ability to interoperate with existing external systems and/or protocols may lead to increased adoption and/or broker flow.

In addition or alternatively to determining timing parameters for routing requests to multiple venues, in some embodiments, aspect(s) of the system may be configured to determine timing parameters for routing multiple requests to the same venue (i.e. in waves or otherwise).

An example of an application of a system 100 for distributed execution of segmented processing requests in accordance with the invention is provided by a financial system 1000 adapted for processing of requests for processing of data representing trades and/or offers for trades, or other transactions, in tangible and/or intangible financial interests such as stocks, bonds, currencies (e.g., foreign exchange), various forms of natural resources or commodities, options, loans, etc. As shown in FIGS. 1A and 1B, for example, in a financial transaction data processing system 1000 in accordance with the invention, signal or data source(s) 102 may include trader system(s) 1102, which may, for example, include trader/broker systems or servers as well as any other sources of bids, offers, or other transactions in financial interests such as currently provided by known financial trading platforms. In various embodiments, such trader systems 1102 may be referred to as order origination systems.

Order origination systems 1102, 102*a* may include systems operated by or on behalf of, for example, entities owned or otherwise controlled by parent or other controlling organizations such as banks or brokerage houses. Order origination systems 1102, 102*b* may, for example, include systems operated by or on behalf of brokers or other trading entities acting on behalf of, for example, individual investors, trading through or with the assistance of independently-controlled banks, institutional investors, and/or other brokerage houses.

Router processor(s) 104 in such embodiments may include, for example, server(s) or other system(s) 1104 that communicate with trader systems 1102, 102, for example through the receipt and transmission of encoded electronic signals representing requests for processing of data representing execution and/or acknowledgement of transactions in financial interests; and which communicate with broker, exchange, or other market systems or execution processor(s) 1106 for execution of such transactions. In such embodiments a processor 104 may be referred to as a Smart Order Router or Tactical Hybrid Order Router (in either case, "SOR") 1104, 104. An SOR 1104 may, for example, include one or more gateway(s) 1122 and/or router(s) 1124 for facilitating communications by router(s) 1104 with one or more trader systems 1102, 102 directly (e.g., through wired communication, using one or more dedicated communication channel(s), or through communication within a single server) and/or indirectly (e.g., through wireless communication, through a network 108, 1108 or through an intermediate server). Exchange or market systems 1106, or other execution processor(s) 106 may be in communication with SOR(s) 1104 through, for example, a network 110, 1110, such as the internet or other public network, which may be the same as the network 1108.

For an embodiment of a system 100 configured as a financial trading or order execution system 1000, requested and executed signal processes provided by source(s) 102 may represent trades or other transactions in financial interests. Such transactions may include, for example, trades and/or offers for trades, or other transactions, in financial interests such as stocks, bonds, currencies (e.g., foreign exchange), various forms of natural resources or commodities, options, loans, etc.; and networked computing resources 106 may be, for example, exchange servers 1106, examples of which may include automatic or electronic market systems.

As will be well understood by those skilled in the relevant arts, an SOR (sub)system, or processor, 1104 receiving such transaction request signal sets can apply a wide variety of processes to the request(s). For example, where the signal sets represent requests for transactions in financial interests, requested transactions can be aggregated, either over time and/or across multiple transaction request sources 1102; and/or processing requests for transactions in one or more interests can be divided for routing to multiple execution handlers or processors 1106, individually or in batches.

The signal sets representing requests for transactions in financial interests, for example, may be FIX sessions as received from client brokers. As examples, two order types or order instructions that may be accepted include immediate or cancel (IOC) orders, and directed single orders.

In the context of IOC orders—a broker could send in a set of signals representing orders that the broker intends to be sent out as a single wave to a set of exchanges. Where the orders are always IOCs, many other functions are simplified as there may be no need for the handling of subsequent cancels or replaces. Accordingly, IOC waves may not need to maintain affinity and may be free to use available exchange sessions to best manage congestion.

In the context of directed single orders, a broker client can use the system to send directed orders to exchanges, taking advantage of network connectivity and exchange sessions. This service can be used by a broker as a primary order gateway to exchanges or as a backup service (reducing their needs for backup connectivity to individual exchanges).

In some examples other order types such as day orders, good till cancelled orders, or any other order type may be used but may require additional tracking to maintain order affinities and results, and can involve sending and receiving multiple messages (e.g. replace/modify/cancel orders and acknowledgements) to and from the different venues.

In some embodiments, using direct or immediate-or-cancel orders, may in some instances allow the SOR system to use a more efficient messaging process which may reduce order messaging loads and/or processing, and/or increase messaging throughput.

In various embodiments, as described herein, order source(s) 102, 1102 can be implemented together with, or as part of, order router(s) 104, 1104. It will be readily understood by those skilled in the relevant arts that any or all of the various components of system(s) 100, 1000, including for example any or all of processor(s) 102, 104, 106, and methods of operating them in accordance with the disclosure herein, may be implemented using any devices, software, and/or firmware configured for the purposes disclosed herein. A wide variety of components, both hardware and software, as well as firmware, are now known that are suitable, when used singly and/or in various combinations, for implementing such systems, devices, and methods; doubtless others will hereafter be developed.

Figure 2:
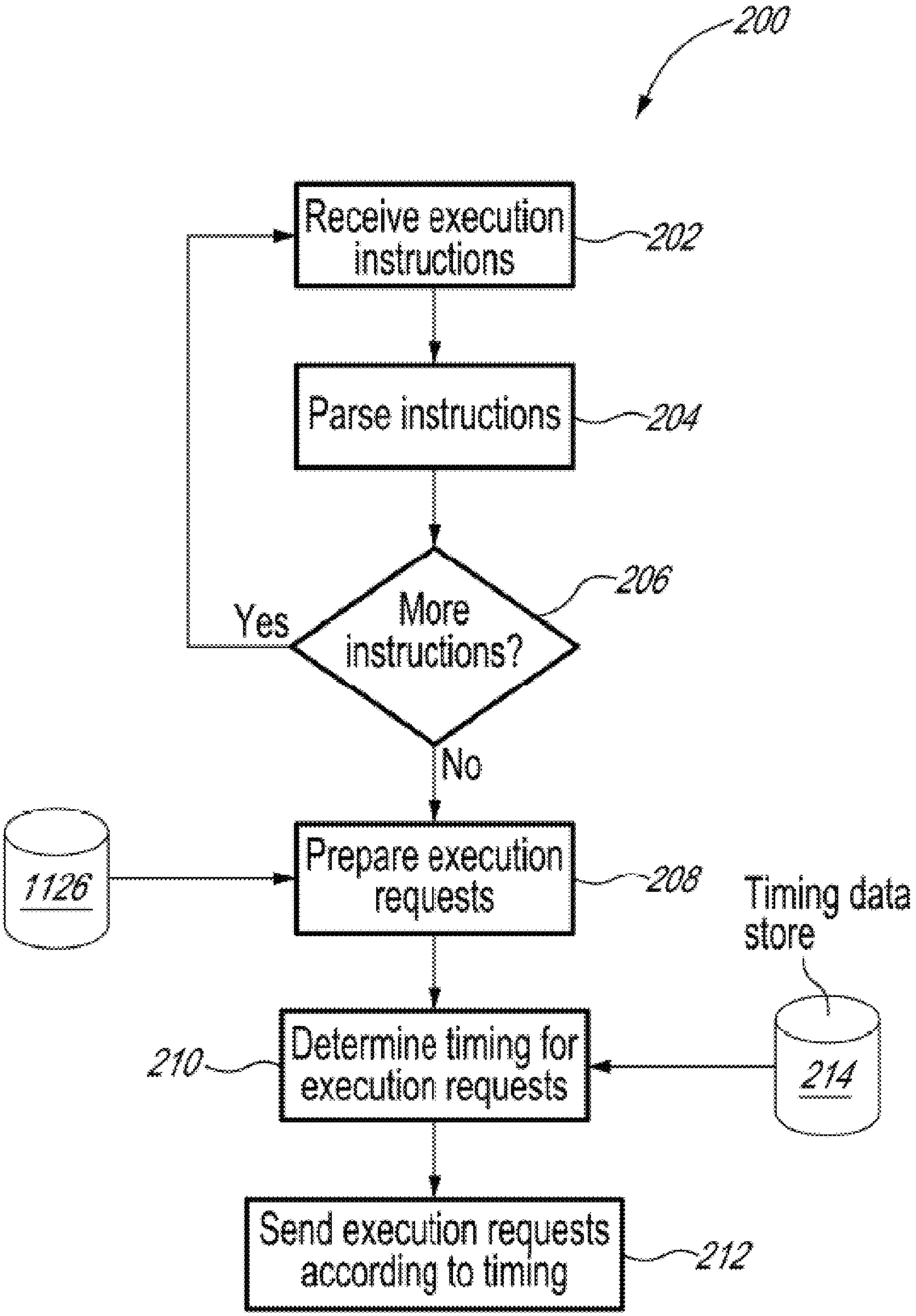
FIGS. 2, 4, 8 and 12 show flowcharts illustrating examples of methods for coordinating processing of data by multiple networked computing resources in accordance with various aspects of the invention.
Figure 4:
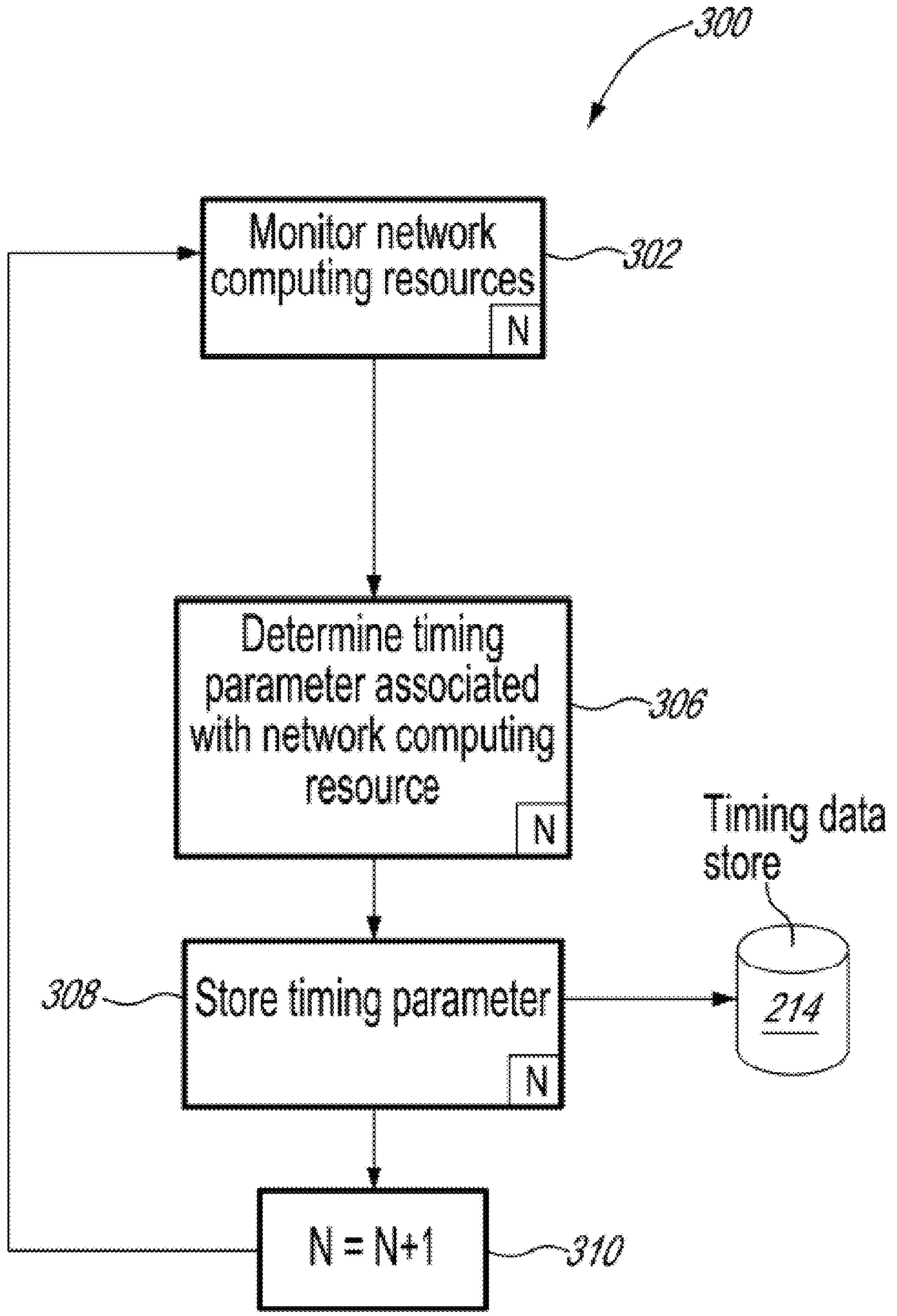

Examples of components suitable for use in implementing examples of systems 100, 1000, and the various processes disclosed herein, including for example processes 200 of FIG. 2 and 300 of FIG. 4, include, for example server-class systems such as the IBM x3850 M2™, the HP ProLiant DL380 G5™ HP ProLiant DL585™, and HP ProLiant DL585 G1™. A wide variety of other processors, including in some embodiments desktop, laptop, or palm model systems will serve.

An example of a method 200 for processing of a transaction request signal set generated by a transaction request signal source 102, 1102, suitable for implementation by a router processor(s) 104 such as, for example, an SOR 1104 of a system 1000, is shown in FIG. 2.

Process 200 of FIG. 2 can be considered to start at 202, with receipt by processor(s) 104, 1104 of signals representing a request for processing of data such as, for example, a transaction in one or more financial interests. In embodiments of systems 100, 1000 comprising SOR routing processor(s) 1104 adapted to process signals representing requests for execution of trades and/or other transactions in financial interests received from transaction signal source(s) 1102, signal sets representing requests for execution of transactions in one or more financial interests can include signals or signal sets representing, for example, one or more identifiers representing:

- the source(s) of the request, such as a URL or other network address or identifier used by or otherwise associated with a trading system 102, 1102;
- the interest(s) to be traded or otherwise transacted, such as an identifier used by one or more exchanges to identify a stock, a CUSIP number for a bond, a set of currencies to be exchanged, etc.;
- a type of transaction (e.g., buy, sell, bid, offer, etc.) to be executed or requested;
- one or more quantities (i.e., amounts or volumes) of the interest(s) to be transacted (including for example any total and/or reserve quantities); and
- corresponding price terms.

Further parameters can include, for example, current and/or historical:

- fill probability for multi-part, or segmented, transaction requests (i.e., the historical proportion of multi-part orders that result in completed transactions);
- amounts of spread between, for example, bid and offer prices, e.g., current and/or relative to historical trends in spread;
- market volatility in specific interests to be traded, or related or corresponding interest(s), or related benchmarks or indexes;
- depth of market book(s), for example current depth relative to historical trends in depth;
- reserve quantities;
- order priority;
- tolerance for information leakage;
- maximum latency period (which may, for example, constrain a maximum size for an associated timing parameter);
- desired routing path;
- desired venue;
- specific routing instructions;
- display quantities; and
- display size and backing, for example on buy and/or sell sides.

Some or all of these parameters may be collected as or based on monitored data associated with one or more networked computing resources.

In other embodiments, such signal sets can comprise content and/or identifiers representing images, text, or other content or to be processed by one or more execution processors 104, 1104, and specific execution requests.

Where incoming client/broker orders would need to be identified as being part of an order wave, in some examples, processor(s) can be configured to receive FIX message repeat groups, where individual orders may have tags that indicate that the order is the Nth order of a wave of M total orders.

Alternately, orders can be marked as being the first and last orders of a wave. In some embodiments, affinity may need to be preserved so that replaces and cancels are handled correctly on the same venue sessions as the original orders.

Among the many types of market systems 1106 suitable with various embodiments of the invention are alternative trading systems (ATSs) of the type known as 'dark' exchanges, or 'dark pools'. Typically, such exchanges do not openly display market offerings to members of the trading public. The use of known or predicted reserve quantities can be especially useful in such embodiments.

Thus an example of a data record to be provided by a source 102, 1102 to request a transaction in a given interest, on stated terms, can include:

<source (102, 1102) of request><type of transaction><interest identifier><quantity(ies)><price term(s)>

Signal sets received by processors 104, 1104 at 202 can be stored in any volatile and/or persistent memory(ies), as appropriate, for archival and/or further processing purposes.

At 204, transaction or other data processing execution requests received at 202 can be parsed by router processor(s) 104, 1104 to place them in any suitable or desired form for use in preparing one or more instruction signal sets to be provided to execution processor(s) 106, 1106. Parsing of instruction signals may include, for example, identifying the type of transaction(s) or process(es) to be requested, including for example volumes and/or quantities of orders or bids for trades in specified interest(s), and whether such volumes are to be bought or sold, or offered for sale or purchase; amounts and/or types of document processing to be done; and the type and nature of networked computing resource(s) or execution processor(s) 106 to be requested to execute and thereby be associated with such execution or processing instructions. In various embodiments parsed instruction sets can be stored in temporary or volatile memory(ies) 118, 1018 accessible by the corresponding processor(s) 104, 1104 for aggregation with other processing requests, division for routing to multiple execution processors/resources 106, 1106, and/or preparation and forwarding of batch or other delayed-execution requests.

In preparing one or more instruction signal sets, an order scheduling module may be utilized that may be configured to handle downstream capacity, queuing, and congestion in the network, exchange gateways, and exchange crossing engine queues.

The module may be configured to anticipate the maximum message/order flow rate that each exchange session can handle, and then pro-actively avoid exceeding or coming close to that rate. The SOR router processor(s) 1104 may be configured to re-sequence or delay sending out the early orders in a wave, if it calculates subsequent orders in the wave or in a following wave could become congested or queued.

The module may be configured with a feedback mechanism (based on ACK round trip latency monitoring) to dynamically determine downstream congestion and queuing delays as these may not be static, consistent, or predictable.

To handle these capacities, the SOR router processor(s) 1104 may be configured to access exchanges using multiple exchange order sessions and may also be configured to load balance the flow across the order sessions.

In some embodiments, instruction sets may consist of FIX messages having built-in mechanisms such as repeating groups having groups of order info stored as multiple constituents within a single message. These messages may often be used to convey waves of baskets—for example, to represent orders of the same stock at different venues, or to represent a portfolio that wants to buy a set of 38 stocks, multiple instances of the same stock order may be transmitted to multiple exchanges with different quantities, conveyed in unison with the SOR router processor(s) determining scheduling using timing.

Instructions received at 202 may be accumulated during defined time intervals, regular or irregular, such as the duration of a business day or any segment thereof, or any other desired time period(s), which may be preset and/or dynamically determined by processor(s) 104, 1104. Instructions may be also be processed individually, as received. If more instructions are to be received prior to processing, or may potentially be received, process 200 can return to 202.

Transaction requests/instructions may be accumulated during defined time intervals, such as the duration of a business day or any segment thereof, or a desired time period, which may be preset and/or dynamically determined by processor(s) 104, 1104. If more instructions to be received, or may potentially be received, process 200 can return to 202.

In embodiments of the invention which employ sorting/aggregation techniques in parsing or otherwise preparing order or other processing requests, at 206 processor(s) 104, 1104 can repeat process 202-204 until all needed or desired related or aggregatable processing request signal sets have been received from source(s) 102, 1102. For example, as described above, arbitrary numbers of data records representing orders or requests for purchase of bonds identifiable by CUSIP (Committee on Uniform Security Identification Procedures) numbers can be received from data source(s) 102, 1102, and stored in memory 118, 1018 associated with the processor(s) 104, 1104, for batch processing, for example:

<source 1><sell><CUSIP No. AA><10,000><price A><res. 9,000><price D>
<source 2><buy><CUSIP No. BB><12,000><price C><res. 1,000><price B>
<source 3><sell><CUSIP No. BB><11,000><price A><res. 8,000><price D>
<source 6><sell><CUSIP No. AA><14,000><price A><res. 2,000><price E>
<source 4><buy><CUSIP No. AA><18,000><price C><res. 7,000><price B>
<source 1><sell><CUSIP No. BB><20,000><price A><res. 3,000><price D>
<source 3><sell><CUSIP No. AA><13,000><price A><res. 6,000><price D>
<source 4><buy><CUSIP No. BB><22,000><price C><res. 4,000><price B>
<source 5><sell><CUSIP No. AA><21,000><price A><res. 5,000><price E>
<source 4><buy><CUSIP No. BB><15,000><price C><res. 7,000><price F>

-continued

| |
|---|
| <source 1><sell><CUSIP No. AA><19,000><price A><res. 3,000><price D> |
| <source 5><buy><CUSIP No. BB><16,000><price C><res. 8,000><price F> |
| <source 6><sell><CUSIP No. BB><17,000><price A><res. 6,000><price H> |

In another example scenario, processor(s) can receive individual large execution instructions from data source(s) 102, 1102. For example:

<source 1><buy><CUSIP No. AAA><100,000><price A>

In another example scenario, as illustrated by example in FIG. 1C, processor(s) can receive order execution instructions in waves. As illustrated in the example instructions in FIG. 1C, in some examples, the incoming execution instructions may also include specific venues fields to identify the networked resource or venue to target.

Upon individual receipt, or at a given periodic rate, a given time, when a given number of orders has been received, when all desired orders have been received, or when any other desired criteria have been satisfied, processor(s) 104, 1104 can, as a part of parsing or otherwise processing instructions at 204, sort and/or group the stored records according to any one or more desired criteria, e.g., by type of transaction request and interest identifier. For example, in the first example scenario above:

| |
|---|
| <buy><CUSIP No. AA><18,000><price C><res. 7,000><price G><source 4> |
| <sell><CUSIP No. AA><10,000><price A><res. 9,000><price D><source 1> |
| <sell><CUSIP No. AA><14,000><price A><res. 2,000><price E><source 6> |
| <sell><CUSIP No. AA><13,000><price A><res. 6,000><price D><source 3> |
| <sell><CUSIP No. AA><21,000><price A><res. 5,000><price E><source 5> |
| <sell><CUSIP No. AA><19,000><price A><res. 3,000><price D><source 1> |
| <buy><CUSIP No. BB><15,000><price C><res. 7,000><price F><source 4> |
| <buy><CUSIP No. BB><22,000><price C><res. 4,000><price B><source 4> |
| <buy><CUSIP No. BB><12,000><price C><res. 1,000><price B><source 2> |
| <buy><CUSIP No. BB><16,000><price C><res. 8,000><price F><source 5> |
| <sell><CUSIP No. BB><20,000><price A><res. 3,000><price D><source 1> |
| <sell><CUSIP No. BB><11,000><price A><res. 8,000><price D><source 3> |
| <sell><CUSIP No. BB><17,000><price A><res. 6,000><price H><source 6> |

As shown, various data fields in the transaction request records can be reordered or otherwise reformatted as needed or desired, to suit the processing needs of the routing processor(s) 104, 1104. For example, as shown, the association of a "source" data item associated with or otherwise accorded a different priority, to facilitate efficient ordering while permitting the processor(s) 104, 1104 to report fulfillment of transactions/requests on completion of order processing.

Process 204 can further include aggregation by processor(s) 104, 1104 of received and sorted transaction requests, into collected or consolidated order(s) for specific types of transactions in specific interest(s), e.g., by summing total or subtotal quantities associated with corresponding transaction requests, thus:

| |
|---|
| <buy><CUSIP No. AA><18,000><price C><res. 7,000><price G> |
| <sell><CUSIP No. AA><77,000><price A><res. 18,000><price D> <res. 7,000><price E> |
| <buy><CUSIP No. BB><65,000><price C><res. 15,000><price E> <res. 5,000><price B> |
| <sell><CUSIP No. BB><48,000><price A><res. 11,000><price D> <res. 6,000><price H> |

Figure 9:
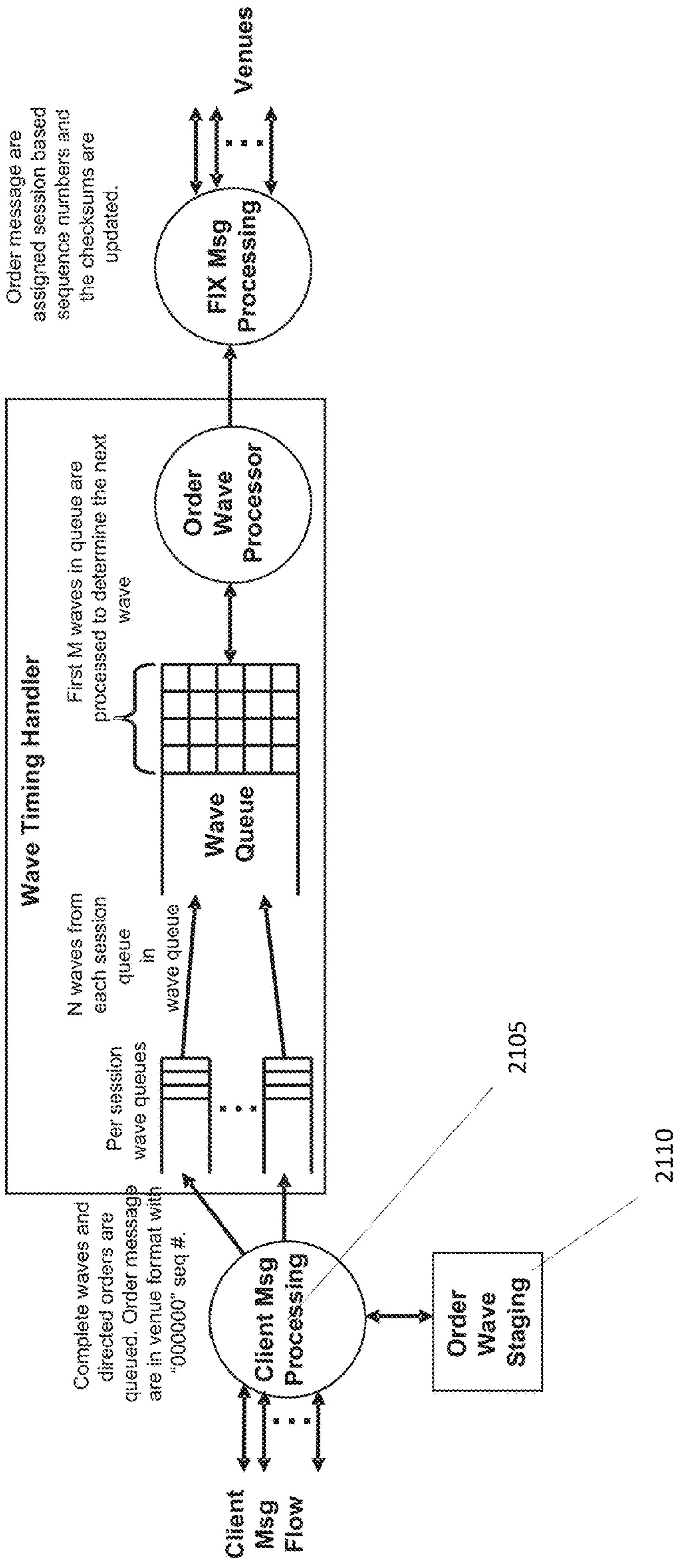

FIG. 9 shows a process and dataflow diagram of example processes and dataflows for an order router/system 104, 1104. In some examples, the order router/system 104, 1104 may include a client message processing module 2105 whereby processor(s) 104, 1104 and/or other hardware components can be configured to receive waves of client messages. In some examples, client order instructions may be received in waves of multiple messages. In some such examples, the client message processing module may be configured to stage order messages in a buffer or other order wave staging memory/storage device 2110 until all order messages pertaining to a particular wave are received.

In one example, a data record to be provided by a source 102, 1102 to request a transaction in a given interest, on stated terms, can, in addition to other fields containing transaction request details, include:

| |
|---|
| <WaveID><Total number of orders in wave><Index of current order> <Timing Mode for Wave><Timing offset for manual timing mode><security key(s)> |

In another example, instead of including a data field indicating the total number of orders in wave, a data record may include a <wave complete> flag to indicate that the current order message is the last message in a wave.

In some examples, the incoming order messages can be in a FIX (Financial Information eXchange) format, or any other standard or proprietary format/protocol.

As illustrated in the example in FIG. 9, once individual orders or complete waves have been received, they may be stored in one or more buffers or other memories/storage devices until they are ready to be processed by a wave timing handler 2115. In the example system in FIG. 9, the complete order requests (including individual orders and complete wave orders) may be stored in multiple levels or queue. For example, order requests may be initially be stored in a client session queue until they are selected to be moved to a wave queue. In some examples, the system is configured to only allow N waves to be present in the wave queue. In some instances, this may prevent a high volume session from dominating the wave queue and routing resources. In some examples, the system can be configured to allow more than N waves into the wave queue when other session queues have not used up their allotment.

In other examples, complete order requests may be stored directly into one or more wave queues (i.e. without any intermediary client session queue).

The wave timing handler 2115 can be implemented by one or more hardware device(s) and/or processor(s) 104, 1104 configured to manage queue(s) and determine which order(s) in the queue(s) will be transmitted to the venues next.

In some examples, a modified first-in, first-out (FIFO) approach may be used by the wave timing handler. However, rather than a strict FIFO, in some embodiments, the timing handler may be configured to rearrange, cherry-pick, skip, or otherwise select the order(s) in a sequence other than simply traversing the queue. For example, in some embodiments, the first M wave orders in the queue can be processed to determine a sequence for routing those M wave orders, or simply to determine which of the M wave orders will be routed next irrespective of the subsequent ordering or otherwise.

In some examples, the wave timing handler can be configured to determine a sequence in which to route the wave orders to increase the out of available order routing throughput, to decrease the period of time required to route all of the orders, and/or to optimize any other operational aspect of the router(s) 104, 1104.

In some examples as described herein or otherwise, the ordering of the processing of waves can be based on venue latencies, throughputs, market data (e.g. available liquidity, pricing, etc.), etc.

When all desired signal sets have been received at 202, and optionally sorted, accumulated, and/or otherwise processed at 204, at 208 processor(s) 104, 1104, using instruction sets processed at 204, can prepare execution-request signal sets for transmission to resources/execution processors 106, 1106. Such execution-request signal sets can comprise any necessary or desirable signals for causing requested processing, including content or data and command signals. For example, in embodiments adapted for processing of requests for transactions in financial interests, requests may be sorted and/or aggregated on the basis of interest(s) to be traded, quantities of interest(s) to be traded, price, etc., and associated with suitable execution command signals. The form of any execution command signals associated with a given request can depend, as those skilled in the relevant arts will recognize, on the nature and type of requests to be executed and the processors 106, 1106 by which they are to be executed, as well any networks 110, 1110 over which signals exchanged between processor(s) 104, 1104 and 106, 1106 are to be sent, including applicable protocols and instruction formatting requirements. Ergo, data pertaining to any or all of systems 106, 1106, 104, 1104, and 110, 1110, protocols used thereby, and/or information related to interests traded, offered, or described thereby may be accessed and used by processor(s) 104, 1104 in parsing and preparing instructions for execution of processing by any of processors or resources 106, 1106. Sources 1126 of such data may include, for example, exchange market data system 1126*v* (FIG. 1B) which, for example, in embodiments of the invention adapted for processing of financial transactions, can include information received from various exchange systems 1106, news information sources such as Bloomberg or Reuters, and/or other sources.

It is sometimes necessary or desirable, in assembling requests for data processing using networked processing resources, including many resources configured for use in executing financial transactions, to break execution and/or other processing requests into multiple parts. Such parts, or segments, can, for example, correspond to portions of larger orders or other data processing requests, to be executed by a plurality of networked resources 106 such as exchange servers or other execution processor or handlers 1106. For example, if a plurality of exchange servers or other markets are available for execution of a transaction request representing a purchase order for a significant amount of a financial interest such as a stock or bond, it may be necessary or desirable to split the order into multiple parts, for execution in multiple markets and/or by multiple exchange servers 1106. For example, sufficient quantities of specific interests may not be available, at all or at desirable prices, on a single exchange: in order to fill an order entirely, it may be necessary or desirable to break a single order into smaller segments and route it to multiple exchanges.

Thus, for example, in various embodiments of the invention directed toward the processing of requests for transactions in financial instruments, when a router 104,1104 is requested by one or more sources 106, 1106 to complete a transaction in one or more financial interests, the router 104, 1104 can, in preparing signal set(s) representing requests for the transactions, access information available from sources such as market data source(s) 1126, as well as any one or more execution processor(s) 106, 1106, to determine the quantities of such interests available through the respective processors 106, 1106 and the terms under which such quantities are available, and can construct an execution request signal set configured for routing to each of the respective desired processors 1106, 1106, based on the number of quantities available at the most favorable terms.

For example, continuing the first example above, it may be necessary or desirable to split one or more incoming processing requests into smaller parts, directed to a plurality of exchanges, in order to obtain fulfillment of the complete order(s). This can be accomplished by, for example, accessing data representing current order books provided by one or more of exchange servers 1106 and dividing the order(s) correspondingly, using known data processing techniques. Thus, for example, the aggregated 'sell CUSIP No. AA' order above may be broken down into portions or segments and associating with data representing such segments URLs or other network resource address identifiers suitable for use in routing the various segments to a plurality of exchange servers A1-C3, as desired, thus:

<exchange A1><sell><CUSIP No. AA><15,000><price A><res. 6,000><price D><res. 2,000><price E>
<exchange B2><sell><CUSIP No. AA><27,000><price A><res. 6,000><price D><res. 2,500><price E>
<exchange C3><sell><CUSIP No. AA><35,000><price A><res. 6,000><price D><res. 2,500><price E>

As described herein or otherwise, in some examples, preparing 208 execution requests can include combining, or splitting orders into fewer or greater orders to a plurality of different venues. In some examples, preparing 208 execution requests can include formatting, rearranging or otherwise preparing original, split and/or combined orders into FIX or other format(s) compatible with the respective destination venues.

In some embodiments, in preparing the execution/trade requests, the SOR routing processor(s) 1104 may be configured to determine which venue an order should be routed to. Various factors may be considered by the SOR routing processor(s) 1104, such as quote size, cost structure, support of various order types, rebate structure, average execution speed, latency, latency variance, historical fill rate, etc.

While the example method 200 in FIG. 2 illustrates the preparation of execution requests 208 and the determination of timing for execution requests 210 as separate blocks, in some embodiments, the preparation and determination of timing for requests may be done in opposite orders, concurrently, and/or may be part of the same process. For example, various factors and observed/measured data as described herein or otherwise may be used to both prepare execution requests and to determine the timing for those requests.

As will be appreciated by those skilled in the relevant arts, execution of individual portions of a distributed transaction or other multi-part data processing request such as a transaction in financial interests placed in multiple exchanges by a plurality of network resources, such as market or exchanger servers 1106 or other execution processors 106, typically requires different amounts of time. That is, if multiple parts of a desired transaction execution request are sent simultaneously to a plurality of exchange execution processors 106, 1106, each part or segment of the transaction request may be expected to execute at a different point in time. This is because the amount of time, or 'latency,' required for transmission of execution request signals from the order router(s) 104, 1104 to the different various resources or execution processor 106, 1106 across a network 110, 1110 or other communications path; for actual processing of corresponding portions of the execution request by the corresponding processors 106, 1106; and/or for return of confirmatory or other data to the order router(s) 104, 1104 typically varies depending upon a number of factors, including for example the network paths between the router(s) 104, 1104 and execution processors 106, 1106; the amount of network traffic being processed by the network(s) 110, 1110; the number of requests being handled by the individual execution processors 106, 1106, etc.

For a number of reasons it can be important, in such cases, to synchronize execution of two or more portions of a multi-part execution request. As one example, when an execution request represents a request for execution of multiple parts of a financial transaction in multiple markets or on multiple exchanges, non-synchronized, staggered execution of individual portions of the transaction by multiple corresponding servers can affect both the possibility of completing later portions of the transaction and/or the terms under which such later portions may be completed.

Figure 3:
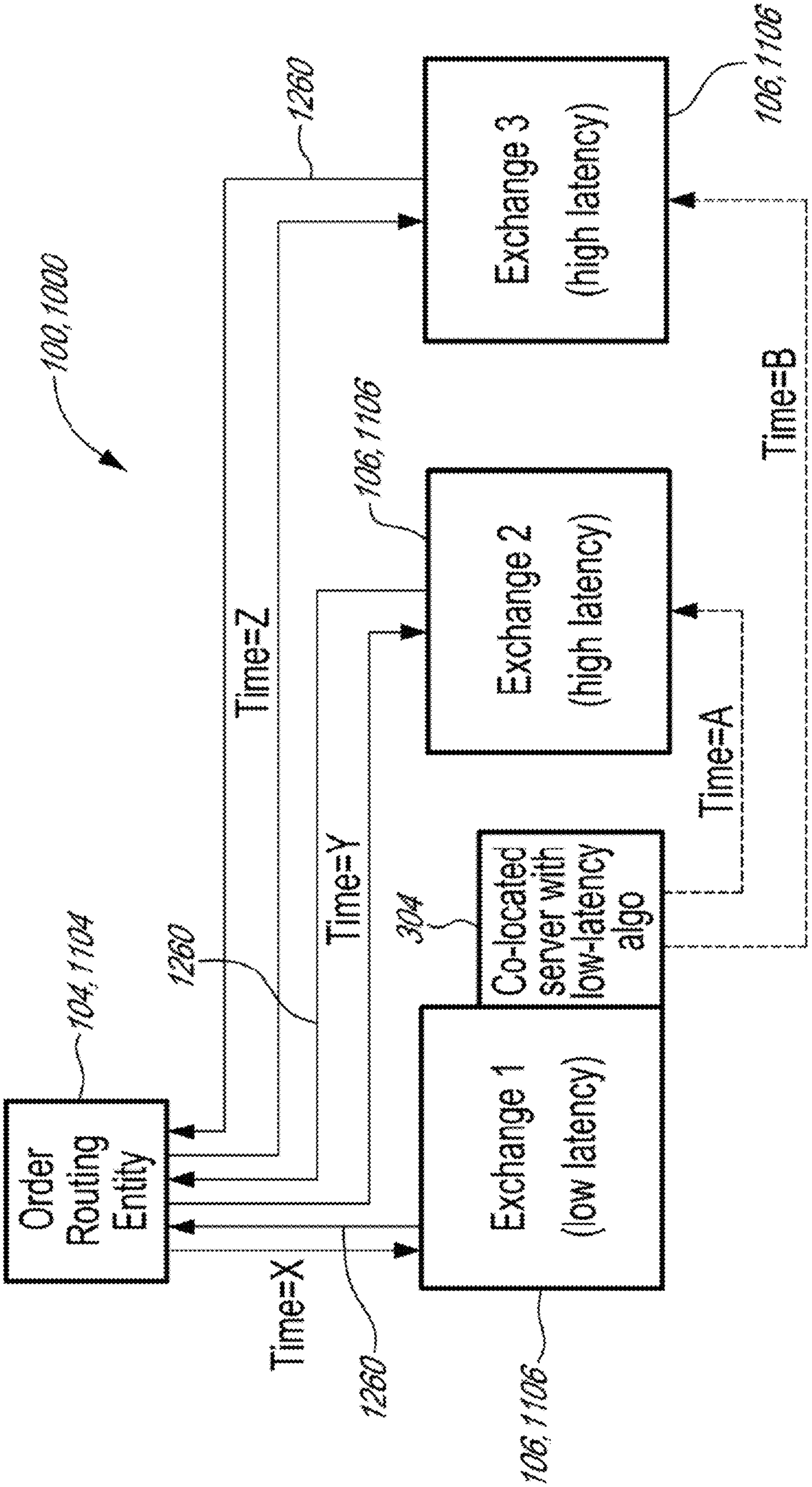

A particular example of the desirability of synchronizing execution requests may be illustrated through reference to FIG. 3. In the example shown in FIG. 3, system 100, 1000 comprises order router 104, 1104 and a plurality of networked execution resources 106, exchange servers or execution processors 1106 "Exchange 1," "Exchange 2," "Exchange 3." In addition, system 100, 1000 of FIG. 3 further comprises a co-located trading server 304 configured to execute trades or other transactions on execution resource 1106 "Exchange 1." As noted in the Figure, co-located trading server 304, which employs a relatively low-latency trading algorithm, is associated with Exchange 1 in such manner that it can execute transactions with Exchange 1 in a relatively short period of time compared to the amount of time required for other processors, such as router(s) 104, 1104, to complete similar transactions with Exchange 1. For example, co-located server 304 can be communicatively linked with Exchange 1 by direct wireline connection, or other rapid-processing system. Moreover, Exchange 1 is capable of completing an execution request with non co-located processor(s) 104, 1104 in a relatively shorter period of time (i.e., with a "lower latency") than is either Exchange 2 or Exchange 3. In other words, as shown in FIG. 3, latency Time X<Time Y and Time X<Time Z, while an execution time for a transaction between co-located server 304 and Exchange 1 is less than any of Time X, Time Y, and Time Z.

If, for example, signals representing a request to trade in one or more financial interests is received by a router processor 104, 1104 from one or more request sources 102, 1102, and the request is of such quantity or magnitude that an order reflecting the request will be too large to be completely filled by any one of Exchanges 1, 2, or 3, the order router 104, 1104 may attempt to check availabilities on the various available processors 106, 1106 and split the order accordingly, in order to route a portion of it to each of Exchange 1, Exchange 2, and Exchange 3. If the router 104, 1104 of FIG. 3 simultaneously transmits to each of execution processors 106, 1106 Exchange 1, Exchange 2, and Exchange 3 a divided portion or segment of the request for execution of the requested transaction, it is possible that trading server 304 (which might, for example, be operated by a high-frequency trading entity, or other speculative investor) will be able fill a portion of that transaction on Exchange 1 by, for example, acting as a counterparty to the proposed transaction by selling or buying all or a portion of the transaction request forwarded to that exchange by the order router 104, at terms stated in the request for the transaction, and have time in which to change or otherwise post terms for filling remaining portions of the order on Exchange 2 and/or Exchange 3, on terms more favorable to the party making the transaction(s) available (e.g., the party operating or acting through the server 304) than those offering such transactions (e.g., those behind orders provided by request processor(s) 104, 1104) might otherwise have sought. In other words, for example, the co-located trading server 304 may, due to the difference in execution latencies associated with trades with Exchange 1, Exchange 2, and Exchange 3, be able fill a portion of the requested transaction on Exchange 1 and move to improve its terms, by for example raising or lowering its bid/offered price, for filling remaining portions of the transaction on Exchange 2 or Exchange 3 before such remaining portions can execute at previously-stated prices, in order to increase its operators' or beneficiary(ies) own profits, or the profits of other traders offering similar interests on those Exchanges.

As may be seen in FIG. 3, such possibilities (which can be referred to as 'latency arbitrage' opportunities) can exist when:

Time X+Time A<Time Y and/or

Time X+Time B<Time Z

It will be appreciated by those skilled in the relevant arts that, even where transaction or other processing request signals are sent simultaneously to each of Exchanges 1, 2, 3 from the router(s) 104, 1104, the time required for each divided portion of the request to be received, acknowledged, and/or processed by the respective resources 106, 1106 (e.g., Times X, Y, Z) may in general be different, for example due to differences in network communications paths and processing speeds in any or all of processor(s) 104, 1104 and/or 106, 1106. Similarly, the time required for trading server 304 to change terms of transaction offerings in each of Exchanges 2 and 3 may in general differ.

Among the disadvantages which can arise in such cases is that traders represented by request source(s) 102, 1102 may pay higher prices in executing their trades than they otherwise would have, in the absence of such arbitrage opportunities; or, if prices on subsequent exchanges are changed sufficiently to put them outside terms stated in their execution requests, they may not be able to complete transactions in desired quantities—for example, all or part of a transaction routed to an exchange processor 1106 may not trade in view of a changed price.

In such examples, in which a trade instruction may not be fully fulfilled at an exchange server 1106 due for example to price or other term manipulation by a third party taking advantage of latencies, in prosecuting data processing requests in one or more exchange servers 1106 it may be useful to time or schedule the sending of trade requests to multiple exchange servers 1106 such that the execution of such trade requests at all exchange servers 1106 happens in a synchronized manner, such as, for example, in a substantially concurrent manner. In particular, it may be useful to synchronize the execution of signal processing execution requests, or portions or segments thereof, in multiple networked computing resources 106, 1106, for example such that the signal processes are received, acknowledged, and/or executed by the resources 106, 1106 in a substantially concurrent manner.

In some examples it may not be necessary for the signal processes to be executed in each processor 106, 1106 to be executed simultaneously, but may be sufficient that:

$\text{Time Y} - \text{Time X} < \text{Time A}$, and/or $\text{Time Z} - \text{Time X} < \text{Time B}$, such that execution of the request(s) or segments thereof occurs before any change in terms can be implemented by a trading server 304. The use of such synchronized timings can, for example, cause:

$\text{Time X} + \text{Time A} > \text{Time Y}$ and/or $\text{Time X} + \text{Time B} > \text{Time Z}$ and thus, for example, defeat latency arbitrage opportunities. In some embodiments, therefore, the invention provides router(s) 104, 1104 the ability to execute transactions across multiple resources 106, 1106 with minimal or no time variance, such that algorithms run by trader(s) 304 employing low-latency algorithms are given insufficient time to react to market changes.

In some embodiments, the timing range required to ensure that latency arbitrage as described in the above equation may be minimized and/or eliminated may determine an acceptable range for the routing of signals representing orders to one or more trading servers 304.

Thus, in these and other cases where synchronization is desired, at 210 processor/router 104, 1104 can determine absolute or relative timings to be assigned to, or otherwise associated with, various portions or segments of an execution request, in order to obtain the desired sequencing. Such timings can be determined in order to cause any desired synchronization: for example, timings configured to cause simultaneous, or substantially simultaneous, execution can be determined, or timings configured to cause any desired sequencing can be determined.

In some examples, a sequence for routing requests can be defined by determining acceptable timing parameters (including ranges) to stagger the routing of the different routing requests. These sequences can include requests to different venues or multiple requests to the same venue. In some examples, the timing sequence can be determined so as to cause related requests to be executed within a defined time threshold. This time threshold can be based on an observed latency arbitrage timing or otherwise.

Thus at 210, a timing parameter can be determined for each signal processing execution request, or portion thereof, to be assigned to each respective networked computing resource 106, 1106. The parameters are determined in such manner as to cause synchronized execution of the signal processing execution requests at each of the respective networked computing resources 106, 1106. This determination can be based at least partly on a corresponding determined latency in the execution time of such request(s) and/or portion(s), such as for example any or all of latencies A, B, X, Y, Z of FIG. 3, and/or any other relevant latencies, in the execution of signal exchanges between the router processor(s) 104, 1104 and each of the networked computing resources 106, 1106, or in the processing of other such signals by any of such devices.

In some embodiments, the timing parameters may be assigned to respective signal processing execution requests, rather than networked computing resources 106, 1106. In some embodiments, the timing parameters are defined as ranges for execution, and may be used in accordance to applied business logic to determine and/or implement routing strategies for association with one or more respective signal processing execution requests. For example, timing parameters may be used to indicate that a particular set of signal processing execution requests should be processed/received/executed within a particular time range, with the time range being determined dynamically by the SOR router processor(s) 1104. For example, a time range may be determined based on various business logic flows receives as parameters the liquidity on the order book of a particular venue. In some embodiments, a time range and/or timing parameter may also be satisfied through the selection of a particular routing path or communication link.

In some embodiments, the timing parameters may take into consideration monitored network conditions and/or characteristics. For example, the variance, standard deviation, median, mean, mode, kurtosis, etc.

Figure 5:
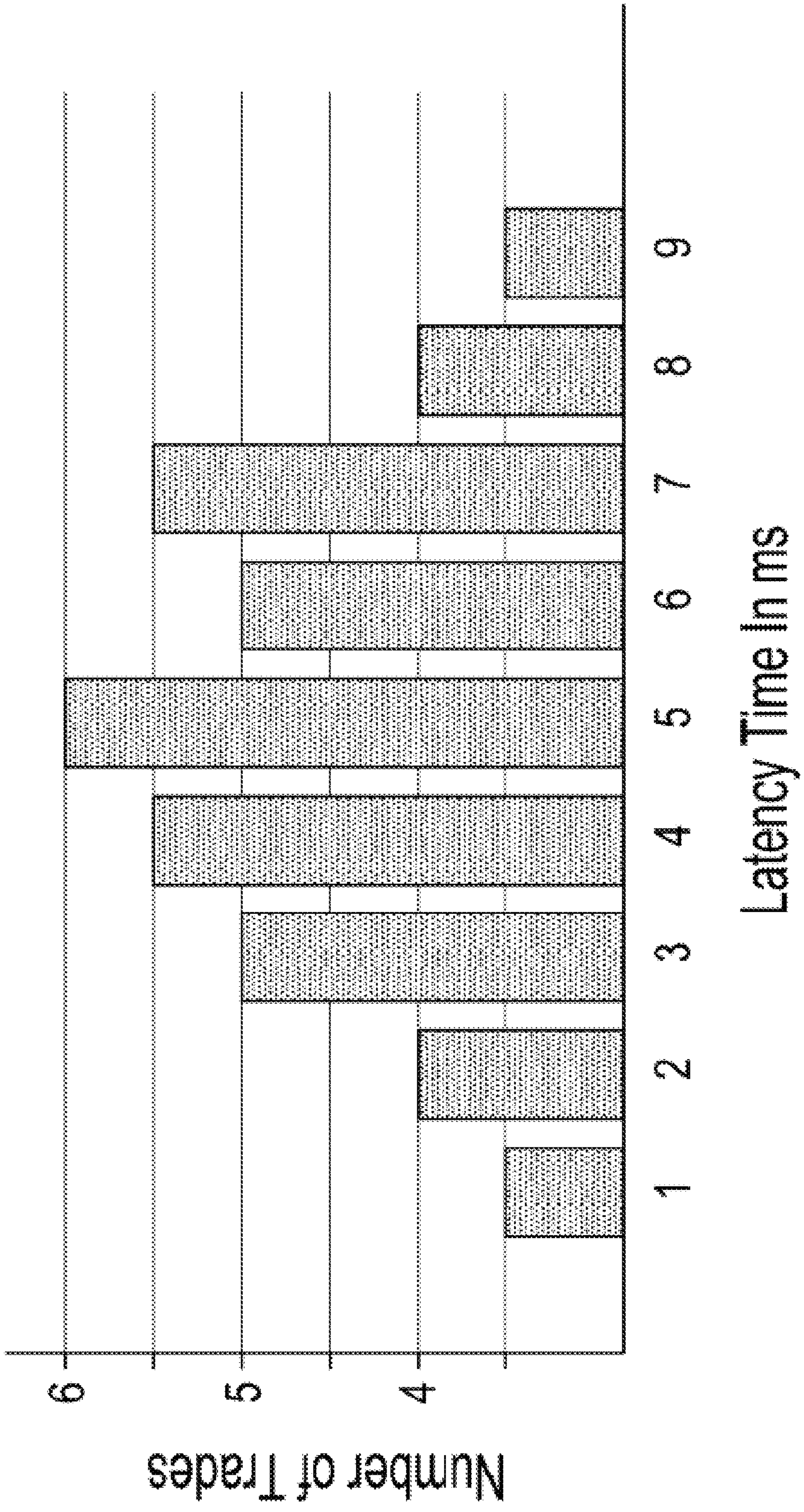
FIG. 5 shows an example histogram that may be used in an example method for managing processing of data by multiple networked computing resources in accordance with various aspects of the invention.

In some embodiments, the timing parameters may be determined based on a timing range and/or probability(ies) that a particular trade will arrive and/or be executed within a particular latency range. As illustrated in FIG. 5, historically monitored latency data can in some examples provide probability(ies) and/or other statistical data such as standard deviations, variance, etc. In some embodiments, the SOR routed processor(s) 1104 may be configured to determine timing parameters which fall within defined statistical thresholds.

As an alternative to, or in conjunction with latency required for transmission, network characteristics may be monitored and utilized by SOR router processor(s) 1104 for the routing of orders.

Monitoring network performance can be a non-trivial task as network conditions may be constantly changing due to a variety of factors, such as network congestion, traffic, available bandwidth, channel strength, noise, artifacts, network events, etc., and the performance may affect the transmission and/or routing of orders. There may be venue-specific network issues, such as congestion at exchange gateways, etc.

In some embodiments, monitored network performance may be approximated and/or modeled using one or more measurements, for example, to determine statistical values, such as mean, mode, median, variance, covariance, correlation, kurtosis, skew, standard deviation, etc.

The monitored network performance may be monitored with varying levels of granularity and scope, for example, an individual network pathway may be monitored, a venue may be monitored, etc. In some embodiments, there may be multiple network pathways that may be used to route a signal to a venue, and the pathways themselves may be monitored for its network characteristics.

For example, there may be three different network links, A, B and C, and if A and B are congested, network link C may be selected.

In some embodiments, the monitoring of network performance may be weighted such that more recent network measurements have greater significance and/or influence on a model, to reflect the currency of the measured information.

Network monitoring may be performed based on a variety of data, for example, scheduled return trip heartbeat messages may be sent to periodically determine network latencies across a number of links. In some embodiments, historical order information and/or routing information may be utilized in determining network performance. For example, the router 1104 sent a dozen orders on this link in the last 2 ms, and a number of latencies having particular characteristics were encountered.

In some embodiments, test messages, duplicate messages, etc., may also be transmitted to determine network latency characteristics. Messages having various lengths and/or instructions, or a lack of instructions may be compared to one another to determine latencies associated with venue processing.

In some embodiments, network monitoring can be configured to determine different components of a trade latency. For example, when roundtrip latency is monitored, the roundtrip latency may be split between two or three components. For example, three components can include the latency associated with transmission of a request being sent to the venue, the latency associated with the execution of the request by the venue, and the latency associated with transmission of a response being sent back from the venue. In another example, the roundtrip latency may be split between transmission latencies (i.e. combined measurement of the transmission latencies for sending the request to the venue, and for receiving the response from the venue), and the latency associated with the execution of the request by the venue. Other combinations of different latency-related components may also be used.

In some examples, the determination of the different components of a roundtrip or other aggregate latency may be based on monitoring the aggregate latency for different request types. For example, requests for different order types or for quotes may result in different aggregate roundtrip latencies and may, in some examples, be used to determine different components of the aggregate latencies, and/or to determine timing parameters for different request types.

In some examples, the processor(s), at 208 and/or 210, may be configured to select venues to target and/or adjust timings based on other factors as described herein or otherwise. In some examples, the processor(s) to select venues and/or adjust timings based on data associated with a venue. This data can, in some examples, be accessed from a data source and/or can be compiled or observed based on capture ratios, latencies and the like.

In some examples, the processor(s) may be configured to prefer venues or to have longer timing differentials for venues which are less likely to have more competition for trade requests (e.g. by a co-located and/or high-frequency trader). In some examples, the processor(s) may be configured to have different preferential rankings or timing adjustments for different venues based on factors which may be indicative of greater competition or a greater risk of losing trades to arbitrage. In some examples, explicit knowledge of an opportunistic co-located trader can be accessed from a data source or can be implicitly determined based on lower capture ratios and/or lower timing differentials involving the particular venue.

In some examples, the processor(s) may be configured to have different preferential rankings or timing adjustments for venues based on the fee and/or rebate structure of the venue. For example, venues which provide rebates for posting certain trades may be more likely to have competition from high-frequency traders.

In some examples, when multiple venue options are available, the processor(s) may be configured to select venues which are less likely to have greater competition. In some examples, the processor(s) may be configured to generate timings which may risk losing liquidity from the venue with greater competition (e.g. scheduling it later in the sequence or with a greater delay) if it increases the chances of capturing liquidity at other venue(s). In some examples, the processor(s) may generate tighter timings for waves involving venues with greater competition.

In some examples, the processor(s) can be configured to select venues and/or adjust timing differentials based on the lost liquidity or lost gross value which would be suffered if a trade request were to arrive too early or too at the venue. This may be, in some examples, based on posted liquidity, posted bid/ask pricing, etc. The processor(s) may be configured to lower the preferential ranking or tighten the timing differential for venue(s) which would result in a greater losses (liquidity or value) if a trade request to the venue(s) were to arrive too early or late resulting in potential arbitrage losses.

In some embodiments, the SOR router processor(s) 1104 may be configured to automatically adjust the value of timing parameters and/or the size of timing ranges in response to various measured values provided as feedback, such as a trade capture ratio, a recent fill rate, etc. For example, a decreasing trade capture ratio may be indicative of information leakage, and ranges for timing parameters may be automatically tightened and/or timing parameters modified in response.

For example, in addition to latency and other parameters, the SOR processor(s) can be configured to monitor the fill rate or capture ratio of previous orders routed along a particular a route or to a particular venue. In some examples, the processor(s) can be configured to determine fill rate or capture ratio by comparing the total transaction volume for all routed related-transaction requests with available liquidity. In some examples, the available liquidity can be the total posted liquidity at each of the targeted venues. In some examples, the available liquidity may be the total posted liquidity at any venue. In some examples, the available liquidity may be based on the posted liquidity data available to the SOR processor(s) at the time that the processor(s) prepare execution requests which may include selecting venues to target and/or splitting a large order request. In some examples, the available liquidity may be based on the posted liquidity data available to the SOR processor(s) when the first transaction request in a wave or sequence is routed.

In some embodiments, available liquidity can include publicly posted liquidity and/or forecasted liquidity. The processor(s) monitoring the data associated with the networked computing resources can be configured to monitor whether publicly posted liquidity that is captured by a previously routed data processing segment is subsequently replenished with new publicly posted liquidity and/or the timing between the capturing of the original liquidity and the re-posting of the new liquidity. The preparation of data processing segments and determination of their timing parameters can be based on this forecasted liquidity data.

In another example, the processor(s) may track or identify when multiple data processing segments (unrelated or related to the same data process) target the same posted liquidity. By monitoring data associated with these data processing segments to see if their fill rates exceed the posted liquidity, the processor(s) can compile this data as captured un-posted liquidity data.

Monitoring the data associated with networked computing resources can include monitoring both the re-posting of liquidity and the capturing of un-posted liquidity as forecasted liquidity data which can be used by the processors to prepare data processing segments and their timing parameters to target such forecasted liquidity data.

In some examples, the processor(s) can be configured to determine the fill rate or capture ratio by compiling the confirmations/acknowledgements or other response messages from the targeted venues to determine the total transaction volume that was successfully captured/completed after all the trade requests in a wave have been routed.

In some examples, the processor(s) can be configured to adjust timing parameters and/or timing sequences based on the determined fill rate or capture ratio. For example, if a capture ratio for a route or venue falls from its previous, historical and/or typical value, the processor(s) may determine that the timing parameters and/or sequences (e.g. based on latencies and/or other factors) are less effective at avoiding any information leakage or arbitrage trades.

In some examples, when a capture ratio falls below a defined threshold or by more than a threshold amount, the processor(s) can be configured to adjust timing parameters (e.g. lower or increase time Y or time Z in FIG. 3), adjust timing sequences and/or lower timing threshold(s) for differences in execution times at different venues (e.g. lower Time=A and/or Time=B in FIG. 3).

In some examples, when a capture ratio falls below a defined threshold or by more than a threshold amount, it may be indicative of a change in a network device such as failing or close to failing link or component in a router or other switching device. In some examples, the processor(s) can be configured to generate an alert or notification that there may be a potential network issue and/or equipment problem. The alert or notification may include audio alerts, visual alerts on a display or light source, message(s) (e.g. email, instant messaging, etc.), or any other mechanism for alerting an administrator that there may be a network issue and/or equipment problem. In some examples, it has been observed that a dropping capture ratio can provide an early warning of an equipment problem or imminent failure before the router or other affected equipment generates its own warning or failure notification.

In some examples, the defined threshold or threshold amount may be absolute or relative values. For example, the processor(s) may be configured to adjust timing parameter(s), sequence(s) and/or threshold(s) when the capture ratio falls 2% or falls 2% of its previous or historical value.

In another example, the processor(s) may be configured to adjust timing parameter(s), sequence(s) and/or threshold(s) when the capture ratio falls outside its typical variance range or varies by a defined number of standard deviations from its norm (e.g. when the capture ratio is 1-3 standard deviations away from the norm).

In some examples, the processor(s) can be configured to determine the variance range and/or standard deviations by collecting capture ratios over X time periods and building a Gaussian or other distribution.

Upon determining that a capture ratio for a route/venue or a pair or group of routes/venues is below defined threshold or has fallen by a defined threshold, the processor(s) can be configured to automatically adjust timing parameter(s), sequence(s) and/or timing differential threshold(s) for the associated route(s) and/or venue(s) to try to increase the capture ratio for future trade request waves or sequences.

In some examples, the processor(s), at 208 and/or 210, may be configured to select venues to target and/or adjust timings based on other factors as described herein or otherwise. In some examples, the processor(s) to select venues and/or adjust timings based on data associated with a venue. This data can, in some examples, be accessed from a data source and/or can be compiled or observed based on capture ratios, latencies and the like.

In some examples, the processor(s) may be configured to prefer venues or to have longer timing differentials for venues which are less likely to have more competition for trade requests (e.g. by a co-located and/or high-frequency trader). In some examples, the processor(s) may be configured to have different preferential rankings or timing adjustments for different venues based on factors which may be indicative of greater competition or a greater risk of losing trades to arbitrage. In some examples, explicit knowledge of an opportunistic co-located trader can be accessed from a data source or can be implicitly determined based on lower capture ratios and/or lower timing differentials involving the particular venue.

In some examples, the processor(s) may be configured to have different preferential rankings or timing adjustments for venues based on the fee and/or rebate structure of the venue. For example, venues which provide rebates for posting certain trades may be more likely to have competition from high-frequency traders.

In some examples, when multiple venue options are available, the processor(s) may be configured to select venues which are less likely to have greater competition. In some examples, the processor(s) may be configured to generate timings which may risk losing liquidity from the venue with greater competition (e.g. scheduling it later in the sequence or with a greater delay) if it increases the chances of capturing liquidity at other venue(s). In some examples, the processor(s) may generate tighter timings for waves involving venues with greater competition.

In some examples, the processor(s) can be configured to select venues and/or adjust timing differentials based on the lost liquidity or lost gross value which would be suffered if a trade request were to arrive too early or too late at the venue. This may be, in some examples, based on posted liquidity, posted bid/ask pricing, etc. The processor(s) may be configured to lower the preferential ranking or tighten the timing differential for venue(s) which would result in a greater losses (liquidity or value) if a trade request to the venue(s) were to arrive too early or late resulting in potential arbitrage losses.

In some embodiments, the router processor 1104 may be configured for optimizing order flow across multiple routes and for multiple orders. For example, increasing fill rate for a single route through a particular routing scheme may disadvantage other routes. The router processor 1104 may be configured to balance the order loads across venues, communication links, network links, time, etc. The router processor 1104 may be configured to determine potential latency impacts that may arise due to congestion caused by the router processor 1104's scheduled routing, and schedule and/or rearrange and/or associate timing parameters accordingly. In some embodiments, the router processor 1104 may be configured to automatically retune and/or shuffle scheduled transmissions.

In some embodiments, the router processor 1104 may be configured for the application of one or more business rules representing business logic. The business rules may cause the skewing and/or weighting of various factors used in determining routing characteristics for a particular instruction set associated with an order. For example, the rules may determine how an order is segmented, which venue(s) an order may be transmitted to, the acceptable range of time, etc.

For example, a particular venue having a particular latency may be favored as the venue may have a high trade capture ratio associated with it, and a higher weight may be associated with the routing of signals to that particular venue.

As another example, a first venue may provide a deeper order book having more liquidity than a second venue. While the first venue may have some less desirable network characteristics, it may be weighted more heavily for selection given the amount of liquidity that is available.

In some example embodiments, SOR processor(s) can be configured to determine venues to target as well as the timing parameters for those venues by weighing liquidity and latency variance.

In some examples, latency variance may be caused by factors such as network traffic, poor or varying signal quality of network communications, network node problems, congestion or overloading at the venue (networked execution processor(s)) and the like.

In some examples, latency variance may be caused by intentionally introduced delay(s) by a venue or aspects of a venue's communication network or device(s). For example, a venue may randomly introduce a delay (e.g. a "speed bump") to order requests of a particular type, or to all orders. This delay will increase the latency for execution of the affected order request. In some examples, venue(s) may introduce a fixed delay (e.g. 350 μs) to order requests. In some examples, venue(s) may introduce a delay having a randomly-selected length (e.g. between 5-25 ms) to order requests.

In some examples, the order requests to which delay(s) are applied and/or the length of the delay(s) may be randomly selected, may be based on the order type, may be based on order parameters/options/flags/etc., and/or any combination thereof.

In some examples, venue(s) may introduce delays having a randomly-selected lengths which are selected from a ranges based on type/parameter/options/flags/etc. of the order requests. For example, one classification of orders may be subject to random delays between 1-10 ms while another classification or orders may be subject to random delays between 14-24 ms.

Data associated with previously-routed data processing segments which may have been subject to such random delays that are monitored by the processor(s) can, in some instances, show a multimodal distribution illustrative of the 1-10 ms range and the 14-24 ms range.

In some examples, the processor(s) can be configured to access defined aspects of intentionally applied delays from one or more database(s) or other data source(s). In some examples, aspects of intentionally applied delays may be observed by tracking historical orders and their respective processing times. Based at least in part on access and/or observed delay information, in some examples, the processor(s) can be configured to determine latency ranges, variances, and other statistical values for the latencies.

Data associated with previously-routed data processing segments which may have been subject to randomly introduced delays that are monitored by the processor(s) can, in some instances, show a multimodal distribution illustrative of a range of latencies without the random delay, and a second range of latencies including the random delay.

In some examples, the processor(s) can be configured to obtain data associated with the available liquidity of a proposed trade for each networked computing resource (venue) which may potentially be used.

In some examples, the data associated with available liquidity may be received from publicly available sources and may include the number of shares openly available at a venue. In some examples, the processor(s) can be configured to determine whether there may be more liquidity than what is openly posted (e.g. iceberg or reserve volume). This determination may be based on data obtained for historical or past orders placed with the venues for similar financial interests, volumes, times of day, counter-parties and/or any other order data.

At 208 and 210, the processor(s) can be configured to divide a large proposed trade into smaller data processes representing smaller trade requests to different venues or other networked execution processors based on the latency and liquidity data. In some examples, the processor(s) can be configured to select venue(s) and volumes based on liquidity data and latency variance.

In some examples, where a venue has a large available liquidity but a large latency variance, the processor(s) may be configured to balance the chance of capturing that liquidity with the chance of losing liquidity at other venues due to market moves during the potential range of latency periods.

For example, in a hypothetical situation: venue A has 5000 shares available at price X, and has a latency of 100 μs+/−80 μs; and venue B has 500 shares available at price X, latency 80 μs+/−1 μs. If the SOR is attempting to capture all 5500 shares, the processor(s) may be configured to route a first transaction request to venue A at t=0, and a second transaction request to venue B 20 μs later. If the transaction requests arrive or are processed in accordance with the mean latency times, the transactions should capture the available volume at both venues at t=100 μs. However, since the latency variance of venue A is so large, it is possible that the trade at venue A could execute at t=20 μs, and before the trade executes at venue B at t=100 μs, the price or availability of the 500 shares at venue B may have changed. Similarly, if the trade at venue A does not execute until t=180 μs, the order at B which executed at t=100 μs may have triggered the market to change or cancel the order at A before the request is processed at t=180 μs.

In some examples, the processor(s) can be configured to select networked computing resource(s)/venue(s) based on a liquidity to latency variance ratio. When the available liquidity at a venue is high, the processor(s) may be configured to target that liquidity even if it has a high latency variance. In some example scenarios, this may involve sacrificing or risking the loss of liquidity at another venue.

For example, in the above situation, based on the liquidity/latency variance ratio or other metric(s) of venue A versus venue B, the processor(s) may be configured to determine timing parameters which create a higher probability that the liquidity at venue A will be captured. For example, assuming that a competing trading system requires 50 μs to observe an order at venue B and change the order at venue A, the processor(s) may be configured to determine timing parameters and/or a timing sequence such that an order request is sent to venue A at time=0 and an order request is sent to venue B after time=51 μs. In this way, if the order at venue A executes at the slowest end of the range at 180 μs, and the order at venue B executes at the fastest end of the range at 130 μs (79 μs latency, 51 μs delay), accounting for the competing trading system time threshold of 50 μs, the order at venue A will be able to be filled without any risk of arbitrage from the order at venue B. As illustrated by this example, the processor(s) may be configured to target venue(s) having large latency(ies) if they have large available liquidities, even if this may risk losing orders at other venue(s) having smaller available liquidities.

In this example, the processor(s) were configured to take the worst case scenario; however, based on risk tolerances, the processor(s) may be configured to select more aggressive timing parameters and sequences.

In some examples, the processor(s) may be configured to select target venues based on liquidity and latency variances. In a first scenario, if a large proposed transaction can be captured by completely avoiding venue(s) having large latency variance(s), the processor(s) can be configured to select and route trade requests to the venue(s) without the large latency variances.

In some examples, the processor(s) may be configured to split the large proposed transaction between a venue with large latency variance and other venue(s) with smaller latencies.

If a venue has a large latency variance caused by intentional or engineered delays, in some examples, the processor(s) may be configured to target the liquidity at the venue by sending multiple orders to the same venue in a timing sequence. For example, if a venue processor applies a randomly-assigned delay that is large relative to typical order execution latencies, in some examples, the SOR processor(s) can be configured to detect that a previously sent order has been delayed and may send one or more subsequent orders in the hope that one of the orders will be processed sooner. In some examples, the processor(s) may be configured to detect that a previously sent order has been delayed by observing order confirmations or response messages indicating that the subsequent orders to the same venue have been processed.

In some examples, multiple orders can be routed to the venue having randomly-assigned delays in conjunction with orders to other venues. In some examples, by sending multiple orders to the venue with random delays, there may be a higher probability that at least one of the orders is processed with little or no delay. In some examples, the processor(s) can be configured to coordinate the burst orders to the venue with random delays with orders to other venues. By using timing parameters and/or a timing sequence based on the low range of intentionally-induced delays for the random-delay venue, and the execution latencies for the others, the processor(s) may be able to capture both the liquidity at the random-delay venue as well as the others. In some examples, this may reduce lost liquidity at the other venue(s) and/or may increase the chances of capturing at least part of the liquidity at the random-delay venue. In some examples, one or more of these timings and burst orders applied by the processor(s) may result in a higher capture ratio.

In some examples, burst orders to a random-delay venue may each be for smaller volumes to reduce the chance of overfilling the initial proposed order.

In some examples, the processor(s) may be configured to determine the number and size of orders in a burst based on the liquidity and range of delays applied by the venue. In some examples, the number and size of orders in a burst may be a function of the number of known arbitrage systems, the port capacity of those systems, and/or the throttle rate of those systems for the random-delay venue.

In some examples, the processor(s) may be configured to determine the number and size of burst orders based on historical burst order performance for the particular venue.

In some examples, when a large portion of liquidity is available at other venues, the processor(s) may be configured to send a burst having fewer orders to a random-delay venue with a timing sequence based on the short end of the possible delay range. In some instances, this may prioritize the capture of liquidity at the other venues while potentially sacrificing or giving up some of the liquidity at the random-delay venue.

In some embodiments, the processor(s) may be configured to send multiple orders to a single venue (random-delay or otherwise) to potentially capture reserve or iceberg liquidity which does not appear on the book.

For example, based on data associated with prior orders or data received from data source(s), the processor(s) may determine that reserve volume may be available in addition to what is visible at a particular venue.

In some examples, the processor(s) may be configured to divide a large order into smaller order requests including two or more order requests to the same venue. In some examples, these two order requests may be routed with timing parameters and/or sequence to capture reserve or iceberg liquidity at the venue.

For example, upon analyzing historical order and/or venue behaviour based on past transaction data, if the processor(s) determine that a particular venue may repost available reserve or iceberg liquidity 80 μs after an initial order is filled, the processor(s) may be configured to send two orders to the venue 80 μs apart. In some examples, the processor(s) can be configured to send the two orders in a sequence with less than 80 μs between them if the processor(s) determine that the second order is likely to be filled irrespective of whether the venue has reposted the underlying liquidity.

In another example scenario, the processor(s) may determine that venue A has 500 shares available at price X, and has a latency of 30 μs; and venue B has 200 shares available at price X, with a latency of 100 μs and likely has underlying reserve/iceberg liquidity.

In some such instances, the processor(s) can be configured to send a first order to venue B for 200 shares at time=0, a second order to venue B for 200 shares at time=50 μs (so as to not overload venue B, or to allow the reserve liquidity to become available, or otherwise), and a third order for 500 shares to venue A at time=70 μs. In this example, the timing sequence determined by the processor(s) may enable the system to capture multiple segments of liquidity at venue B while still capturing the liquidity at venue A.

In some examples, the processor(s) can be configured to split order(s) and determining timing parameters/sequences to capture multiple portions of a reserve/iceberg volume at a first venue and liquidity at other venue(s) before counterparty systems can change the volume or pricing at either the first venue (with the reserve/iceberg volume) or the other venue(s).

Arbitrage and other problems caused by variations in execution time between servers can also be minimized or eliminated by reducing absolute latencies in transmission and execution of processing requests. Thus the determination of timing parameters as described above can be practiced in combination with procedures which also serve to minimize absolute amounts of time associated with execution and/or reporting of execution requests by resource(s) 106, 1106.

Information on determined latencies used in determining timing parameters to be associated with the various portions of a multi-part execution request provided by router(s) 104, 1104 to a plurality of execution processors 106, 1106 may include timing information (e.g., transmission delays, signal propagation delays, serialization delays, queuing delays, and/or other processing delays at the router processor(s) 104, 1104, the networked computing resource 106, 1106, and/or network(s) 110, 1110, 108, 1108). Such information may be provided by or received from any source(s), and may be stored in and retrieved from one or more data stores 214. Timing data store(s) 214, in various embodiments, may include databases or other data structures residing in memory(ies) 118, 1018 associated with or otherwise accessible by router processor(s) 104, 1104. For example, if execution of a portion of an execution request associated with a first networked computing resource 106, 1106 has a longer determined latency than that associated with a second networked computing resource 106, 1106 (as for example in the case of Exchange 1 vs. Exchanges 2 and 3 of FIG. 3) timing for requests associated portions of a transaction request to be routed to these two networked computing resources 106, 1106 may be determined such that an execution request, or portion thereof, associated with the first networked computing resource 106 is timed to be sent earlier than the request associated with the second networked computing resource 106, with the aim of having the requests executed at the two networked computing resources 106 substantially concurrently, or within an effective minimum time A or B associated with possible term manipulation by a trading server 304.

In some embodiments, one or more algorithms, which may for example use a latency probability model or other predictive model, may be used in determining timing parameters to be associated with portions of execution requests to be routed to various execution processors 106, 1106, based on information associated with such communication and/or processing delays, or latencies. For example, a rolling average of historical latency data, accumulated over or relevant to any desired devices, time periods, or other timing considerations may be used to predict an expected latency for execution of a data processing request.

One example of an algorithm suitable for use in determining timing parameters to be associated by router(s) 104, 1104 with portion(s) of requests for execution provided by source(s) 102, 1102, where it is desired to cause concurrent or otherwise synchronized arrival of such portions or requests at network resources 106, 1106, is based on an average latency between transmission of request signals from router(s) 104, 1104 and an appropriate timing reference. Such timing reference(s) can for example include start of processing by the corresponding targeted resource(s) 106, 1106, and/or receipt by routing processor(s) 104, 1104 of a confirmation signal generated by the resource(s) 106, 1106 on receipt of the request and/or completion of execution of the request. For example, in some embodiments, it can be advantageous to measure latencies between transmission to a given resource 106, 1106 and receipt by the router(s) 104, 1104 of a confirmation or acknowledgement signal, or other appropriate response signal 1260, from such resource 106, 1106, and to use such measured latency(ies) in determining timing parameter(s) at 210.

Process step 210 may for example be carried out by an application executed by, or a module of, or otherwise associated with, routing processor(s) 104, 1104 such as a capital management entity or module 1126 in the case of a financial system 1000. Determination of a timing parameter to be associated with each part or segment of a multi-part execution request may, for example, include use of an adaptive exchange round-trip latency (RTL) learning & compensation logic module 1126*c*, such as that shown in Figure FIG. 1B. Referring to FIG. 3, such an adaptive exchange RTL learning & compensation logic module 1126*c* may determine the timing for each signal processing request (e.g., a trade request) as follows:

1) For each portion or segment n of an m-part multi-part processing request X, a time $T1_{x,n}$ provided by, for example, a clock associated with the processor(s) 104, 1104 is time-stamped by processor(s) 104, 1104 at a desired defined point within the process of parsing or generating the transaction order(s), or other processing request(s) X, and is associated with a processing request signal set record(s) corresponding to each part or segment n of the m-part request X.
2) $T2_{x,n}$ for each portion n of the multi-part request X is time-stamped by the processor(s) 104, 1104 when the corresponding $n^{th}$ portion request signal set has been received at the targeted exchange 106, 1106, and a corresponding exchange-generated confirmation message has been received by the requesting routing processor 104, 1104.
3) During the course of a trading day (or other data processing period), process steps 2 and 3 may be repeated, and corresponding $T1_{x,n}$ and $T2_{x,n}$ determined for each transaction segment routed to a given execution processor 106, 1106.
4) For each portion segment n of a subsequent pending multi-part execution request Y, the determined timing parameter $RTL_{y,n}=\Sigma(T2_{x,n}-T1_{x,n})/Z$, where Z is the number of previously-executed order segments routed to a given execution processor 106, 1106 used in the calculation.

Where timing data store(s) 214 store a rolling record of past timing parameters (e.g., a plurality of determined timing parameters $RTL_{y,n}$) associated with one or more execution resources 106/exchange server 1106, such data may be used to create a rolling histogram, which may be used to predict current or cumulative latency for each resource 106/exchange server 1106. Because such predictions are based on a continuously-changing ("rolling") record, this process may be referred to as "online learning." There may be a component (e.g., an exchange latency histogram memory or processing component, not shown) within the adaptive exchange RTL learning & compensation logic module 1126*c* responsible for this.

An adaptive exchange RTL learning & compensation logic module 1126*c* may use predicted latencies to determine appropriate timing parameters to be used in transmitting trade (or other data processing) requests to various exchange servers 1106 in order to compensate for differences in execution latencies associated with such exchange servers 1106, in a way that reduces, controls, minimizes or eliminates differences in timing of execution of portions of divided trade requests routed to different exchange servers 1106, and thus, for example, reduces or eliminates opportunities for latency arbitrage by opportunistic traders.

Adaptive RTL module(s) 1126*c* can use a variety of algorithms in determining timing parameters suitable for use in synchronizing execution of multi-part processing requests. For example, such a module may use latency values determined for the various exchanges to determine the extent to which the router(s) 104, 1104 should compensate for different exchange latencies by sending to the various processors 106, 1106 their corresponding portions of a request for processing at, for example, different times. This can minimize delay between completion of execution of each portion by, for example, minimizing the difference in time between receipt of each respective portion by its corresponding execution resource 106, 1106. (In FIG. 3, for example, this would be shown as minimizing differences between times elapsed at Time X, Time Y and Time Z.) Such algorithms can also account for historical differences in the time required for execution of trade or other processing orders on the various resources 106, 1106, in addition to communication delays. The adaptive RTL module(s) 1126*c* may be configured, for example, to determine timing ranges, to maintain network monitoring models, network monitoring logs, etc.

The adaptive RTL module(s) 1126*c* may also be configured for the automatic tuning of timing parameter/sequences depending on information, such as fill rate, trade capture ratio, predicted network characteristics, etc.

Adaptive exchange RTL learning & compensation logic module(s) 1126*c* may additionally collect information about market conditions prevailing in each exchange server 1106 (using, for example, sources of data such as exchange market data source(s) 1126*v*), wave orders/executions, actual latencies and target latencies (e.g., as predicted above) when trade requests are sent. There may be a component within the adaptive exchange RTL learning & compensation logic module 1126*c* responsible for this.

One or more timing parameters associated with execution requests to be routed to any one or more of execution processor(s) 106, 1106 can also be provided to the corresponding routing processor(s) 104, 1104 (e.g., to timing data store 214) by, or determined by such processor(s) 104, 1104 using related data supplied by, any one or more market data feed(s) or processor(s) 1126 (including e.g., any one or more of processors or (sub)systems 1126*a*-1126*g* and/or 1126*v*), and/or by processor(s) 106, 1106 themselves.

In some examples, the processor(s) may be configured to evolve by randomly introducing small variations to various timing parameters and/or venue selection factors. By measuring the resulting capture ratios over time, and re-adjusting the timing parameters and/or venue selection factors, the processor(s) can, in some examples, evolve towards more optimal timings and/or factor weightings. In some examples, this feedback loop can allow the processor(s) to automatically adjust for any changes in the network, venues, behavior of competitors and the like.

In some examples, by considering capture ratios or fill rates, the processor(s) may inherently account for any number of underlying factors such as network conditions, networked resource conditions, competitor behavior without any specific understanding of which underlying factors may have affected the capture ratio. In some instances, this may result in a simpler system and/or more efficient system which can adjust for changes or variations without potentially complex computations of all the possible underlying factors.

At 212, the various portions of the optionally aggregated and divided signal processing execution request(s) are sent to the respective networked computing resources 106 according to timing parameters or sequence(s) determined or otherwise acquired at 210. Thereafter the request(s), or the various portions thereof, may be executed by the respective execution resources 106, 1106, with subsequent signal communications and processing as needed or desired. As will be understood by those skilled in the relevant arts, once they have been made familiar with this disclosure, once the parameters of a desired execution request have been determined by router(s) 104, 1104, signals representing those parameters may be assembled, using known or specialized data processing techniques; formatted according to the Financial Information Exchange (FIX) protocol and/or any other desired protocol(s); and transmitted, written or otherwise communicated to the corresponding execution processor(s) 106, 1106 using known or specialized signal communications techniques, and executed in accordance with requested transaction or other data processes.

For example, continuing the example above, timing delays, or parameters X', Y', Z', one or all of which may be equal to zero or any other suitable time period, may be determined according the disclosure above and associated with the order segments generated by processor(s) 1104 for purchase of 77,000 bond lots of CUSIP No. AA bonds at price A, with 25,000 lots (18,000+7,000) in reserve at prices D and E, respectively, thus:

<delay X'><exchange A1><sell><CUSIP No. AA><15,000><price A>
<res. 6,000><price D><res. 2,000><price E>
<delay Y'><exchange B2><sell><CUSIP No. AA><27,000><price A>
<res. 6,000><price D><res. 2,500><price E>
<delay Z'><exchange C3><sell><CUSIP No. AA><35,000><price A>
<res. 6,000><price D><res. 2,500><price E>

Thereafter, routing processor(s) 104, 1104 can process the transaction segments by using timing parameters, e.g., delays X', Y', Z', to cause the corresponding transaction segments to be transmitted or otherwise provided to the exchanges 106, 1106 A1, B2, C3 for execution according to a desired timing sequence, for simultaneous or otherwise-desired sequential execution.

Following execution of all or as many portions of routed transaction or processing segments, routing processor(s) 104, 1104 can receive from corresponding execution processor(s) 106, 1106 data confirming or otherwise indicating such execution, and by accessing data records stored in associated memory(ies), can allocate execution results to the requesting source(s) 102, 1102.

Reference is now made to FIG. 4, showing an example of a method 300 of determining timing parameters to be used in managing processing of data by multiple networked computing resources 106. In the embodiment shown, method 300 is an iterative method, and each loop of the method 300 is denoted as N. Method 300 is suitable for implementation using, for example, any of various embodiments of systems 100, 1000 and components thereof, including particularly router processor(s) 104, 1104 and data source(s) 1126.

At 302, each of a plurality of networked computing resources 106, 1106 is monitored, for example by router processor(s) 104, 1104, execution processor(s) 106, 1106, external processor(s) 1126, and/or various components or modules operated by or otherwise associated therewith, for latencies associated with receipt and/or execution of signal processing execution requests. This may be carried out, for example, by a monitoring module (e.g., an exchange RTL measurement module 1126*b*, such as for the financial system 1000) in the router processor(s) 104, 1104. Such monitoring may comprise, for example, time stamping outgoing requests for processing of data, and comparing times of receipt of confirmation(s) or results from processing to the corresponding time-stamped outgoing request. The difference in time between the outgoing request and the incoming receipt confirmation and/or data processing results can be defined as a data or signal processing latency, and stored in memory accessible by the router processor(s) 104, 1104. By timing differences between outgoing requests and incoming receipts, confirmations, and/or results, such latencies can be monitored on a continual, periodic, and/or other dynamic basis.

At 306, at least one timing parameter associated with latency(ies) observed in execution of signal processing requests provided to the monitored resources 106, 1106 by the routing processor(s) 104, 1104 is determined. As described herein, such timing parameter(s) may include, for example, latencies due to communication delay, such as transmission delays or other signal propagation delays, and/or processing delays, among others. Typically, corresponding timing parameter(s) are determined for each of the plurality of networked computing resources 106, 1106 to which a transaction order or other data processing request, or a portion thereof, is expected to be sent by routing processor(s) 104, 1104.

In various embodiments, such as in various forms of financial systems 1000, and depending upon the types of system(s) to be used and desired processing results, such timing parameters may be determined for one-way and/or round-trip communications between the routing processor(s) 1104 operated by or on behalf of a capital management entity and the exchange server 1106; that is, from generation of a multi-part transaction request by capital management entity's routing processor 1104 to the receipt of a response, such as confirmation of receipt of a part of a larger trading order and/or confirmation of execution of all or part of a requested trade, from the execution resource to which the processing request was directed. With reference to FIG. 1B, for example, and explained above, an RTL measurement may include latencies due any or all of transmission of signals within the capital management entity server 1104, processing of signals within the capital management entity 1104, transmission of signals between the capital management entity 1104 and a network 1110, transmission of signals within the network 1110, transmission of signals between the network 1110 and the targeted exchange server 1106, and processing of signals within the exchange server 1106; for both communications sent from the routing processor(s) 104, 1104 and responses (e.g., acknowledgement of communication, rejection of a trade request, confirmation of a trade request, etc.) sent from the exchange server 106, 1106. In such embodiments, the timing parameter(s) may be simply the total time for the round-trip communication, or a statistical or other mathematical function thereof.

For example, an exchange RTL measurement module 1126*b*, such as that associated with SOR 1104 shown in FIG. 1B, may determine a timing parameter as follows:

1) A time-stamp value T1 is associated by the processor(s) 1104 with a new communication M1 (e.g., a trade request) sent to an exchange server 1106.
2) A time-stamp value T2 is associated by the processor(s) 1104 with any response to the request M1 received from the exchange processor 1106 to which the request M1 was sent. This response can be any response such as acknowledgement, rejection, whole or partial fill, etc., and may depend on the nature of the request represented by M1.
3) The RTL associated with the request M1 is calculated as the difference between T2 and T1. In some embodiments, as noted above, RTL may be calculated as an average of the time (T2−T1) for a past number Z (e.g., 30) of processing requests routed to each of a plurality of targeted exchange processor(s) 1106.

At 308, timing parameter(s) associated with each networked computing resource 106 may be stored in timing data store(s) 214. As described herein, a timing data store 214, in some examples, may be a database or other data structure residing in a memory associated with or otherwise accessible by the router processor(s) 104. Timing parameter(s) stored in timing data store(s) 214 may be employed in processes such as those described above in connection with process block 210 of FIG. 2.

Timing parameter(s) determined by processor(s) 104, 1104 may for example represent rolling histogram(s) representing latencies associated with individual execution processors 106, 1106 and/or other components of system(s) 100, 1000.

FIG. 5 shows an example of a histogram illustrating stored data representing processing latency time values associated communications and/or other processing associated with an execution processor 106, 1106 in a system 100, 1000. In the example shown, round-trip latency times (in ms) are stored for the most recent 30 transaction requests or other communications with a given execution server 106. Although the example shows 30 latency times being stored, the number of stored timing parameter(s) used in determining RTLs or other timing parameters may be greater or fewer, and may vary according to conditions such as the time of day, the season, etc. The results of calculations based on the stored latencies, and other related data, may also be stored in timing data store(s) 214. For example, in the example of FIG. 5, in addition to raw latency times, a rolling average or a rolling mode of the past 30 (or other suitable number) latency times associated with communications and/or other processing with or by each execution server 106 may also be calculated and stored in timing data store(s) 214.

As will be readily understood by those skilled in the relevant arts, further factors, including for example desired fix offsets or delays, or scaling factors associated with time of day, day of week, season of year, etc., known trading or other data processing patterns, economic conditions, etc., may be used at 210 in determining timing parameters.

Timing parameters determined at 210 can be used by routing processor(s) 104, 1104 to synchronize execution of processing requests originated by source(s) 102, 1102 and directed to processor(s) 106, 1106 by, for example, associating with such requests, or portions of them to be forwarded for execution by each of multiple processor(s) 106, 1106, data items useable by the processor(s) 104, 1104 to cause communication of the requests to the corresponding processor(s) 106, 1106 at desired absolute or relative times, to achieve desired synchronization of the arrival of the requests at the corresponding execution processor(s) 106, 1106. For example, by using data items configured to cause communication of one or more portions of the requests at given time(s) according to a clock associated with the processor(s) 104, 1104, the processor(s) 104, 1104 can cause the request(s) or request portion(s) to be communicated at a desired time of day, or in any desired relative order or sequence without regard to the actual time of day, but rather with respect to each other or some third index.

At 310, N is incremented by one, or other suitable value, or control is otherwise returned to 302 so that the process 302-308 continues. Optionally process 302-310 continues until a maximum desired number of iterations has been completed, or until all requests for transactions or other processing by orders have been processed (e.g., routed to execution processors 106, 1106), or until other suitable criteria has been met.

To aid operators and users of system(s) 100, 1000, or components thereof, understand or evaluate the effect of the disclosed method and system for causing processing of data by multiple networked computing resources, in some aspects, the present disclosure also provides various metrics (e.g., trading benchmarks, in the case of a financial system 1000) which may be determined by, and through the use of data generated from, any or all of the various components of a system 100, 1000.

Reference is now made to FIG. 6, which shows comparisons of results of transmission of multi-part trade execution requests to pluralities of networked computing resources, or execution processors 106, 1106 according to an example of the disclosed method and system, to results of conventionally-transmitted multi-part trade requests.

FIG. 6A shows results of execution of a multi-part transaction request using the disclosed methods and systems to obtain synchronized (in the illustrated case, substantially simultaneous) execution of the various parts or segments 624 of the multi-part transaction request (a sell order) by a plurality of exchange servers 106, 1106. In the example shown, a fill rate of 94% of an original aggregated order was achieved at the original offer price 630 of $4.21 (shown as "Level 1"). In a second round of transactions (which was filled in a single transaction, as shown at 626) the remaining volume was sold at a less-desired but still acceptable price 632 of $4.20 (shown as "Level 2"). The cost associated with the orders filled below the requested order price (i.e., those orders in Level 2) was $53,000 for the trader systems 1102 (e.g., client systems) and $10,049 for the capital management entity 1106.

In FIG. 6B, using prior-art trading methods and systems, an unsynchronized multi-part trade request (multi-exchange sell order) consisting of multiple, unsynchronized order segments 624' for the same overall transaction request resulted in an initial fill rate of 47% at the preferred order price 630 of $4.21 (shown as "Level 1"). A further 43% of the request was subsequently filled at the less-desirable price 632 of $4.20 (shown as "Level 2"), with the remainder being filled at a further reduced price 634 of $4.19 (shown as "Level 3").

Using methods and systems in accordance with the disclosure, a volume-weighted average sale price (VWAP) 636 of $4.2094/share was realized, as shown at 628. Using prior-art methods and systems, a VWAP 638 of $4.2038/share was realized.

As will be readily understood by those skilled in the relevant arts, systems 100, 1000 can comprise devices or components suitable for providing a wide variety of further metrics and functionalities. For example, reference is now made to FIG. 7, which illustrates two examples of the provision by a routing processor 104, 1104 or other processor of a benchmark comparison relative to a market average price provided by, for example, a market news service or other market data source 1126*v*. At 646, performance of a system 100, 1000 in synchronized processing of a multi-part transaction request in accordance with the invention is compared to a market performance indicator "Average Price Benchmark." Such average price benchmark, or other benchmark or metric factor, can be obtained from, for example, any or all of components 1126, 1106, etc. At 644, performance of a system 100, 1000 in un-synchronized processing of a multi-part transaction request in accordance with prior art methods is compared to the same market performance indicator "Average Price Benchmark." Comparison of comparisons 646, 644 indicates that processing of transactions in accordance with the invention provides better results for a seller of financial interests. As will be understood by those skilled in the relevant arts, a wide variety of benchmarks may be used in assessing performance of systems and methods according to the invention. Such benchmarks may be determined at least partially by the nature of the system 100, 1000 used, and the types of transactions or other execution requests processed by such system.

Figure 8:
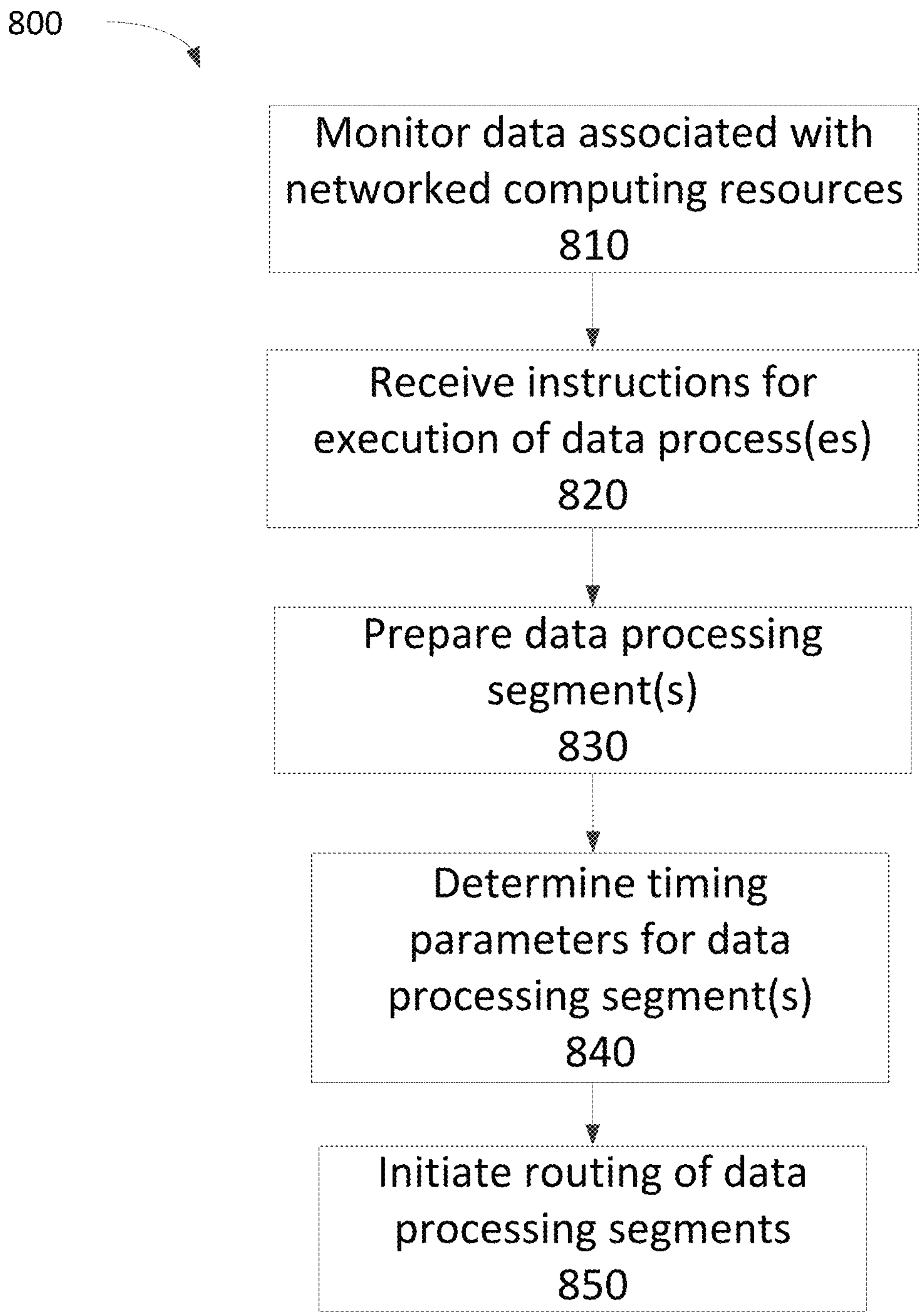

FIG. 8 is a flowchart illustrating aspects of an example method 800 for coordinating processing of data by multiple networked computing resources. The method is suitable for implementation by router processor(s) 104 such as, for example, an SOR 1104 or by any one or more processors in system 1000.

Aspects of the example method 800 in FIG. 8 are similar or the same as those appearing in FIGS. 2 and 4 and described in various example embodiments described herein. Therefore, any examples or implementation details described with respect to those figures or as described herein can be applied to the method of FIG. 8. Similarly, examples and implementation details described with response to FIG. 8 can be similarly applied to the example methods of FIGS. 2 and 4. All of these variants and combinations of these aspects are contemplated by the present description.

At 810, one or more processors 104 in the system 1000 monitor data associated with the networked computing resources 106. As described herein, in some embodiments, the data associated with the networked computing resources can, among other things, include data associated with data processing segments previously routed to the networked computing resources.

In some embodiments, data associated with previously routed data processing segments can include timing information associated with when a data processing segment is routed (for example, using a timestamp), when a data processing segment is processed at a networked computing resource (for example, a timestamp or processing time field in a response message), when a response message is received at the system (for example, using a timestamp). In some embodiments, monitoring such data can include determining execution latencies for the data processing segments (and/or the different latency components) and associating them with the corresponding networked computing resource.

In some embodiments, monitoring data can include monitoring and comparing latencies for different types of data processing segments. For example, different types of data processing segments routed to the same venue may have similar transmission latencies, but may have different latencies associated with the actual execution of the data processing segment. In another example, data processing segments having different lengths or even a lack of instruction may have different latencies when routed to the same networked computing resource.

In another example, an improperly formatted data processing segment may be quickly rejected by a networked computing resource such that the processors can be configured to assume that all or most of the latency associated with such a data processing segment is attributable to transmission latencies.

In some embodiments, the processors in the system are configured to determine the different latency components associated with a particular networked computing resource based on differences between the total latencies for different order types/lengths/etc.

In some examples, latency components can include but are not necessarily limited to outgoing transmission latency, execution latency and return transmission latency (e.g. of a response message).

Monitored data associated with previously routed data processing segments can, in some examples, include data in one or more response messages indicating whether the data processing segment was successfully processes and/or to what extent it was successful. For example, a data processing segment representing a trade request, data in one or more response messages to the trade request can indicate whether the trade was filled, how much of the request was filled, and/or a price at which the request was filled.

Monitored data associated with the previously routed data processing segments can include data indicating the liquidity of a financial interest posted or otherwise known to be available at the networked computer resources at the time an initial data processing segment in a wave is routed, or at a time before the initial routing.

In some embodiments, monitoring the data associated with previously routed data processing segments can include determining one or more capture ratios for each data processing segment and/or for one or more data processes as a whole. Processor(s) can determine a capture ratio by comparing the available liquidity targeted at a networked computing resource with the actual liquidity captured by the trade request. The capture ratio of previously routed data processing segments can be monitored on a segment by segment basis and across all data processing segments divided from the original one or more data processes.

In some embodiments, the monitored data can include data parameters identifying a risk of information leakage for each of the networked computing resources. For example, parameters can be set to indicate the presence of a co-located or active low-latency third party server, a rebate scheme which encourages one or more trade request types, data associated with data processing segments previously routed to a computing networked computing resource indicating that one or more related data processing segments were unsuccessful, etc. In some examples, monitoring the data includes generating a risk of information leakage score based on the monitored data.

In some embodiments, the system has multiple network routes to a networked computing resource. In these embodiments, the monitored data associated with a particular networked computing resource may be monitored/associated on a route-by-route basis.

In addition to routes, in some examples, the monitored data can also include latency data and or status information for route segment(s) along one or more routes and/or device(s) on one or more routes.

In some embodiments, monitoring the data can include acquiring, measuring or requesting data from one or more components or devices in the system as described herein or otherwise. Some data monitoring may involve various calculations.

Monitoring data can include storing the data in one or more memories or data storage devices in the system. In some embodiments, multiple data points associated with networked computing resources can be collected to provide a range and/or distribution/probability for the data.

At 820, the processor(s) receive, from one or more data sources 102, signals representing instructions for execution of one or more data processes that are executable by one or more of the networked computing resources 106. As discussed above, for example with reference to FIG. 2, the one or more data processes can, in some embodiments, represent requests for execution of trades and/or other transactions in financial interests.

In some examples, the instructions for the execution of data process(es) may include specific parameters for executing the data process including: process priority, tolerance value for information leakage, a maximum allowable latency period between any data processing segments, a desired routing path, a desired venue, specific routing instructions, etc.

At 830, based on the monitored data, the processor(s) prepare data processing segments for the one or more data processes. In some examples, preparing the data processing segments can include combining, dividing, or otherwise determining and preparing a number and size of data processing segments for executing the received one or more data processes.

In some embodiments, the processor(s)' preparation or division of the data processes into the at least one data processing segments includes selecting to which of the networked computing resources to route one or more data processing segments. This selection is based on the monitored data associated with the networked computing resources.

Preparing/dividing the data processes also includes determining a size of each of the data processing segments. In some embodiments, this may include a size of a processing task, or a size of a trade request. The processors are configured to determine the size of each of the data processing segments based on the monitored data.

The selection and size determinations, in some embodiments, can be based on monitored data including one or more of: available liquidity at the networked computing resources of financial interest(s) associated with the data process, a risk of information leakage, and latency(ies) associated with the networked computing resources.

While the preparation of data processing segments may be based on targeting available liquidity at multiple networked computing resources, in some examples, the processor(s) may determine that a single data processing segment is to be sent to a single networked computing resource. Alternatively, this may be viewed as sending a size 0 or no data processing segment to other networked computing resources.

At 840, the processor(s) determine timing parameters for the data processing segments. The timing parameters are based on the monitored data, and can identify differences in the timing of initiating the routing of the data processing segments. In some examples, the timing parameters can define timing offsets or delays between which a first data processing segment is to be routed relative to the routing time of a second data processing segment. In some examples, the timing parameters can define a range of times within which a first data processing segment is to be routed relative to a routing time of a second data processing segment.

In some embodiments, the timing parameters can define a probability or risk factor for information leakage associated with different time sub-ranges within the range of times.

The timing parameters are determined to as to cause synchronized execution of the data processing segments. In some examples, the timing parameters can be determined with the aim of having the data processing segments execute as closely together as possible. In some examples, the timing parameters can be determined with the aim of having the data processing segments executing in a desired sequence and/or with desired relative timings. In some examples, the timing parameters can be determined with the aim of capturing as much liquidity as possible and/or at as desirable a price as possible. In some examples, the timing parameters can be determined based on the distribution of a randomly-introduced delay at one or more of the networked computing resources.

At 850, the processor(s) initiate the routing of the data processing segments to their respective networking computing resources based on the timing parameters.

As described herein or otherwise, the division of data processes, the determination of the number, size and destination networked computing resources of data processing segments is based on the monitored data associated with the networked computing resources.

In some situations, the processors are configured to consider different tradeoffs between available liquidity, risk of information leakage and/or latency variance for one or more networked computing resources.

For example, by default or based on a risk tolerance value associated with a data source from which a data process has been received, the processor(s) can prepare data processing segments and timing parameters to target as much liquidity as possible despite a higher risk of data leakage and of losing part of the liquidity or a better price. Conversely, based on a different default or lower risk tolerance value associated with a data source, the processor(s) can prepare data processing segments and timing parameters to target a smaller amount of liquidity with a lower risk of data leakage.

As described herein or otherwise, in some embodiments the processors can prepare data processing segments and timing parameters based on available liquidity.

In some embodiments, market data can include public market data and special market data. For example, in some embodiments, the public market data includes data is published, broadcasted, or otherwise made available publicly. For example, publicly available market data can be provided by a data source to any system or device requesting, accessing, subscribed to, or otherwise receiving the market data. In some embodiments, special market data can include market data which is not available to the public. For example, special market data can include market data which is provided to or otherwise accessible by select systems or devices. In some embodiments, special market data is only accessible by or otherwise provided to systems which have appropriate credentials and/or are associated with the system providing the market data.

In some embodiments, a special market data can include market data which is provided by one or more devices or systems which have information and/or resources for completing data processing requests which are separate from information and/or resources available from devices or systems associated with regular/public sources such as stock exchanges.

In some embodiments, market data can be received from two or more sources. For example, the system can receive market data from a first source such as a public source (e.g. stock exchange data) and a second source such as a special market source (e.g. data from electronic liquidity providers). In some embodiments, data from an electronic liquidity provider is data identifying market resources communicated via a non-public source.

The example market data received from the sources noted below can in some embodiments include public and/or special market data.

In some embodiments, market data processing module **1126*a*** receives and processes market data from market data sources such as systems associated with electronic liquidity providers (ELPs) or Single Dealer Platforms (SDPs). In some embodiments, the systems associated with ELPs or SDPs can include one or more networked computing processors. An ELP or SDP can provide electronic interfaces to a market maker's principal inventory or interest which can be used to complete one or more data processes/data processing segments. In some embodiments, market data can include data received regarding resources available in dark pools.

In some embodiments, market data can include data received regarding resources available for over-the-counter (e.g. direct market participant to market participant) trade execution.

In some embodiments, received market data can include indication market data. In some embodiments, indication market data can include data providing an indication of available market resources at the networked computing resources. Indication market data can include data representing indications of interest (IOIs) which can define symbols, volumes (i.e. potentially available liquidity) and/or prices of potentially available trade orders at a one or more networked computing processors/resources. In some situations, data representing an IOI can provide an indication that market resources (e.g. market orders/availability/liquidity) to satisfy a data process or data processing segment were available at the time of the IOI or otherwise have the potential to be available. For example, market data representing an IOI can include financial interest symbols, the potential availability liquidity of that financial interest, and the potential price of that financial interest.

In some embodiments, data representing an IOI can provide only a subset of the market resource requirements for execution of a data processing segment. For example, in some embodiments, data representing an IOI can provide a financial interest symbol, and the potential availability liquidity of that financial interest, but may not include the potential price of that financial interest. In some such embodiments, the system prepares data processing segments based on a bid, ask, mean, threshold, limit, or other determined price.

With reference to FIG. 8, in some embodiments, at 830, the processors prepare data processing segments for the one or more data processes based on monitored data which includes data representing indications that resources for satisfying a request associated with a data processing segment are potentially available at one or more networked computing processors.

In some embodiments, the processors combine, divide, or otherwise determine and prepare a number and size of data processing segments by preparing one or more data processing segments having a destination networked computing processor associated with a system from which data representing IOIs was received.

In some embodiments, to accommodate the possibility that resources for satisfying a request to be sent in response to the IOI data may not actually be filled, the processors can prepare data processing segment(s) which have requested quantities which are less than the quantities indicated as being potentially available in the IOI data. In some embodiments, the processors prepare data processing segment(s) which have a requested quantity which is one quarter ¼ of the quantity indicated as being potentially available in the IOI data. In some embodiments, the requested quantity is between 10-35% of the quantity indicated as being potentially available in the IOI data.

In some embodiments, the processors can be configured to not send multiple requests to the same networked data processor(s) of a system corresponding to IOI data in the hope of capturing hidden liquidity. In some situations, this prevents allocating a portion of a data process to a destination which could not be completely satisfied (e.g. filled), and in some situations, may reduce information being given up beyond the size the IOI data indicated the destination system was interested in trading.

In some embodiments, when preparing data processing segments, the processors can be configured to recognize that potential liquidity associated with IOI data could also correspond to market data at other destinations.

In some embodiments, the processors can monitor data based on previous fill rates based on IOIs associated with a destination, and can adjust data process segment sizing based on historical IOI data such as historical fill rates, TCAP, timings of requests vs. IOI data timestamps (e.g. slippage over time), prices, impact of execution on lit market prices/liquidity, and the like.

In some embodiments, the processors can quantify risks of data leakage, and/or risks that IOIs do not or are no longer associated with actual availability liquidity. In some embodiments, the processors prepare data processing segments, and timing parameters based on these risk values.

In some embodiments, a financial trade request quantity associated with a data processing segment can be sized based on this historical data.

In some embodiments, when networked computing processors associated with systems providing IOI data show that they are less likely to cause price and/or liquidity changes at other destinations, the timing and/or size of requests sent to these networked computing resources can be adjusted. In some examples, data processing segments may be sent to these networked computing resources first and/or with looser timing requirements (i.e. have larger timing variances) relative to (and/or whose timing is not dependent on) other networked computing resources.

In some embodiments, the processors are configured to only to prepare data processing segments destined for networked computing processors based on IOI data when the parent data process requires liquidity which is four times as big as the availability liquidity at networked computing resources not associated with IOI data.

In some embodiments, data processing segments can be prepared with smaller message sizes to speed up the generation of these segments resulting in smaller lags between receipt of a parent data process, and generation and routing of child data processing segments.

In some embodiments, when data processing segments are based on FIX messages, the processors can be configured to use reduced FIX tags. In some embodiments, the processors replace a standard library C++ string with a custom string class using small string optimization.

In some embodiments, FIX sequence numbers are implemented using memory mapped files.

In some embodiments, common integer values are done using pre-calculated lookup tables.

In some embodiments, serialized message headers are built prior to data processing segment sweeps/saves with placeholders for sequence number and checksum. In some embodiments, checksums are calculated prior to sweeps for everything but sequence number (which are not known until order generation time).

In some embodiments, the system have a reduced number of mutex locks in the preparation of data processing segments processes. In some embodiments, memory can be pre-allocated to avoid allocations during execution of processes requiring low latency. In some embodiments, Kernel bypass is utilized to reduce network write latency.

Any number of the above feature can be used alone or in combination to reduce the latency of child request messages.

In some embodiments, when special market resource data is received from sources associated with multiple data processing resources (e.g. IOI feeds from different ELPs), the FIX message can include a feed identifier for monitoring purposes as described herein or otherwise.

As illustrated for example in FIG. 4, by continuously and/or periodically monitoring the data associated with networked computing resources, the system can, in some instances, establish more accurate and/or up-to-date data such as latencies, risk factors, liquidity, etc. In some examples, over time, the monitored data can establish frequencies, distributions, etc. of one or more types of monitored data.

In some examples, by monitoring timing parameters and result data for previously-filed data processing segments and waves, the processors may establish local minima or maxima values that provide better outcomes. In some embodiments, when determining and/or applying timing parameters for routing, the processor(s) may introduce random timing variations into a timing sequence. In some examples, these variations may be small relative to the timing parameters and/or may be selected such that the varied times still fall within a range that satisfy the timing parameters. In some examples, the introduction of the timing variations and by monitoring the data associated with the affected data processing segments, resulting adjustments to the timing parameters may more quickly converge to a more optimal value, or may discover different local minima/maxima.

In some instances, for example when a particular networked computing resource randomly introduces delays or speed bumps, timing parameter distributions may be multimodal. In some embodiments, the processors may divide data processes into at least two data processing segments to be routed to the particular networked computing resource, and can establish timing parameters based on the multimodal distribution. For example, the processors may generate a burst of data processing segments with smaller trade requests with the objective of having at least a subset of the data processing segments executed without being subject to the intentional delay or speed bump at the networked computing resource.

In the embodiment shown in FIG. 1B, source(s) 1126 of monitored data useable by processor(s) 104 in preparing financial transaction or other data processing execution requests includes a plurality of modules **1126*a-g* useful in preparing a multi-part execution request. In the example shown, modules 1126*a-g* include market data processing module 1126*a*, exchange round-trip latency measurement module 1126*b*, adaptive exchange round-trip latency (RTL) learning & compensation logic module 1126*c*, smart sweeping share allocation logic module 1126*d*, smart posting logic module 1126*e*, regional & national exchange access logic module 1126*f*, and aggressiveness management module 1126*g***.

Market data processing module **1126*a* receives and processes market data, which may be the same as or different from data provided through exchange market data module 1126*v* of the exchange server 1106. Sources of such data may be internal to the system 1104**, or external, as needed or desired, and may include any suitable private or publicly-available sources of data useful in preparing execution requests, and particularly such requests that are useful in dividing or otherwise preparing a transaction order: information provided can, for example, include the numbers or quantities and/or prices available on any particular exchanges; historical trading volumes or prices; current and historical depth of market(s) or liquidity; reserve sizes; absolute, relative, and/or average price spreads; and stock- or interest-specific heuristics; and/or trends in any or all thereof.

Exchange RTL measurement module 1126*b* determines timing parameters for use in synchronizing execution of multi-part trade or other data processing requests by pluralities of exchange server 1106*s*, as for example explained herein, using statically-defined latency data representing time(s) elapsed between sending of requests or other data to, and receipt of confirmation or execution results from, individual execution processor(s) 106, 1106.

Adaptive Exchange RTL measurement module 1126*c* determines timing parameters for use in synchronizing execution of multi-part trade or other data processing requests by pluralities of exchange server 1106*s*, as for example explained herein, using dynamically-defined ("rolling") latency data representing times elapsed between sending of multiple processing requests, or other data, to, and receipt of confirmation or execution results from, individual execution processor(s) 106, 1106. Histograms and other data models and/or structures representing such rolling data may be used by module(s) 1126*c* in determining timing parameters according to such processes.

Smart sweeping share allocation logic module 1126*d* includes a statistical model for strategically oversizing transaction requests, and/or associating reserve quantity(ies) with publicly-posted orders, based on historically observed market data. This module 1126*d* determines, for example, a suitable oversizing (i.e., over-ordering on a trade request) to be incorporated in an open order, taking into consideration predicted hidden reserve quantity(ies) in an exchange server 1106, based on statistical data about the hidden reserve available in that exchange server 1106 over a given period or under other specified conditions (e.g., the past 30 trade requests). Based on such predicted hidden market reserves, a suitably-sized hidden reserve can be determined, and associated with a transaction order, to result in a strategic oversizing of the publicly-viewable order and help to ensure that an actual desired trading volume is realized.

Smart posting logic module 1126*e* includes a statistical model for determining the probability of fills (i.e., percentage satisfaction of a trade request) expected to be realized in trade requests routed to individual exchange servers 1106. Such statistical models may for example include historical fill data realized on such individual exchanges over a given period (e.g., the past 30 trade requests, last month, previous 12 months, etc.). A smart posting logic module 1126*e* may take into consideration factors including, for example, the depth of the top of book at each exchange server 1106, the volatility level across exchange servers 1106 and the mean latency time to execution of a trade request, among other factors.

Smart posting logic module 1126*e* may also be configured for determining trade capture ratios for historical orders, for example, by dividing the desired liquidity at the time the order was submitted and/or transmitted, with the actual captured liquidity that was achieved through the execution of the order.

Regional & national exchange access logic module 1126*f* provides information about how a trade request should be routed to an exchange server 1106, depending on whether the exchange server 1106 is regional or national. Internally- and/or externally-stored data related to suitable protocol(s) to be employed, regulations to be observed, etc., may be employed in providing such data. Such data may be used, for example, in ensuring that trade or other processing requests forwarded to external resources 106, 1106 by routing processor(s) 104, 1104 are suitably formatted, in view of the resource(s) 106, 1106 to which the request(s) are provided, and in ensuring that such request(s) comply with all applicable legal standards.

Aggressiveness management logic module 1126*g* includes a probability model for determining the probability of a fill percentage for individual exchange servers 1106, and modifying execution requests routed to such servers accordingly. Such a module 1126*g* may take into consideration factors such as, for example, the fill rate at each exchange server 1106, the depth of book at each exchange server 1106, and the volatility levels across exchange servers 1106, among other factors.

In some embodiments, specially constructed order messages may be utilized for order routing. For example, the router processor 1104 may be for FIX message (or other protocol) message handling. The venue side of the system, performs the scheduling part of the processing and the following message handling functions:

Adjusting the sequence number—since the sequence number can only be determined once the order is scheduled. To do this, the FIX engine will always generate a null, fixed length sequence number field (like 8 or 9 zeros "000000000"), then the scheduler will overwrite this field with the actual sequence number.

Adjust the checksum based on the sequence number—to reduce the processing, the FIX engine will pass a message with a correct checksum for the "000000000" sequence number field. Then when the scheduler updates the sequence number, it subtracts the non-zero characters in the sequence number from the checksum; thereby avoiding recalculating the checksum for the entire message and reducing the processing to a very simply and mechanical operation.

The sequence number will be passed back to the sending FIX engine with-in the router processor 1104 so that it can be incorporated into the session logs/state.

Messages from the venues will bypass the scheduler and be handled directly by the FIX engines.

In some embodiments, scheduling and message updating can be reduced to very "mechanical" operations that lend themselves to high speed coding techniques and potential hardware acceleration (in FPGA, etc.).

As described above, in some embodiments, the sequence in which order waves are removed from the queue and routing to the associated venues can be based on any of the factors described herein or otherwise.

Routing trade requests in a timing sequence may include delaying one or more trade requests in a wave/sequence. In some instances, this may improve the capture ratio of a trade, but routing a number of trade requests in a timed sequence may inherently take longer than sending them all at once.

In some examples, at 208 and/or 210, the processor(s) can be configured to determine a sequence for routing the trade requests of multiple waves. In some examples, this may include interspersing, overlapping or otherwise routing at least some trade requests for different waves concurrently.

In some examples, the processor(s) can be configured for sequencing the trade requests of multiple waves while respecting intra-wave timing parameters as well as general timing parameters such as a minimum message interval that must be respected to avoid overloading or queuing at a venue.

In some examples, general or venue specific timing parameters may be based on observed timing factors such as latencies and fill rates. In some examples, general or venue specific timing parameters may be based on characteristics associated with network devices, links and/or venues. These characteristics can include but are not limited to device, link and/or throughputs or performance limitations, performance factors based on service level agreements.

For example, the table in FIG. 10 illustrates example monitored data received or determined from monitoring network performance, historical orders and/or historical order data.

With these example latencies and throughputs, in an example scenario, the 4 order waves illustrated in FIG. 11A are received (and the associated default timing parameters are displayed).

Without modification, and assuming a 10 microsecond processing rate between waves, the table in FIG. 11B lists the times when orders are routed and in parentheses, the times when orders hit the venue processor(s) and the resulting timing error.

In this example, if timing errors must be within 100 microseconds of the target, each of waves B, C and D would not meet the target. This scenario requires 2130 microseconds of the router's time and 2910 microseconds including the venues.

In another example scenario, waves C and D can be reordered to be sent earlier because they are for unrelated symbols. The table in FIG. 11C shows the timings if wave D is started immediately after wave A, and then waves B and C are started simultaneously.

While waves B, C and D all miss the 100 microsecond target, there is an improvement to the overall time to handle all 4 waves (1310 microseconds at the router and 2600 microseconds including the venues).

In the next scenario illustrated in FIG. 11D, the waves are routed anticipating venue congestion and preserving order wave sequences.

As illustrated, all waves meet the 100 microsecond target, but the handling time has increased to 3700 microseconds.

As illustrated in FIG. 11E, in the next scenario, the wave timing handler can be configured to schedule orders to be routed in an inter-wave timing sequence, as well as an intra-wave timing sequence based on both venue throughput/congestion and latencies.

In the above scenario, all waves meet the 100 microsecond target, and the handling time is 2300 microseconds for the router and the venues.

In some examples, the wave timing handler may be configured to determine an optimal or best available schedule for the next N waves. In some examples, when N is small (e.g. less than 10), the wave timing handler may use a brute force algorithm by calculating the resulting handling time all possible sequence and selecting the best one.

In some examples, when N is larger or when a brute force approach results in inordinate delays to the wave routing process, the wave timing handler may be configured to calculate as many possible sequences in a defined/allotted amount of computation time/cycles and selecting the best one.

In some examples, the processor(s) can be configured to apply other job scheduling optimization algorithms to schedule the different waves in the shortest handling time.

In some examples, the number of waves to be included in the scheduling algorithm may depend on the number of venues and/or trade requests in the waves.

Figure 12:
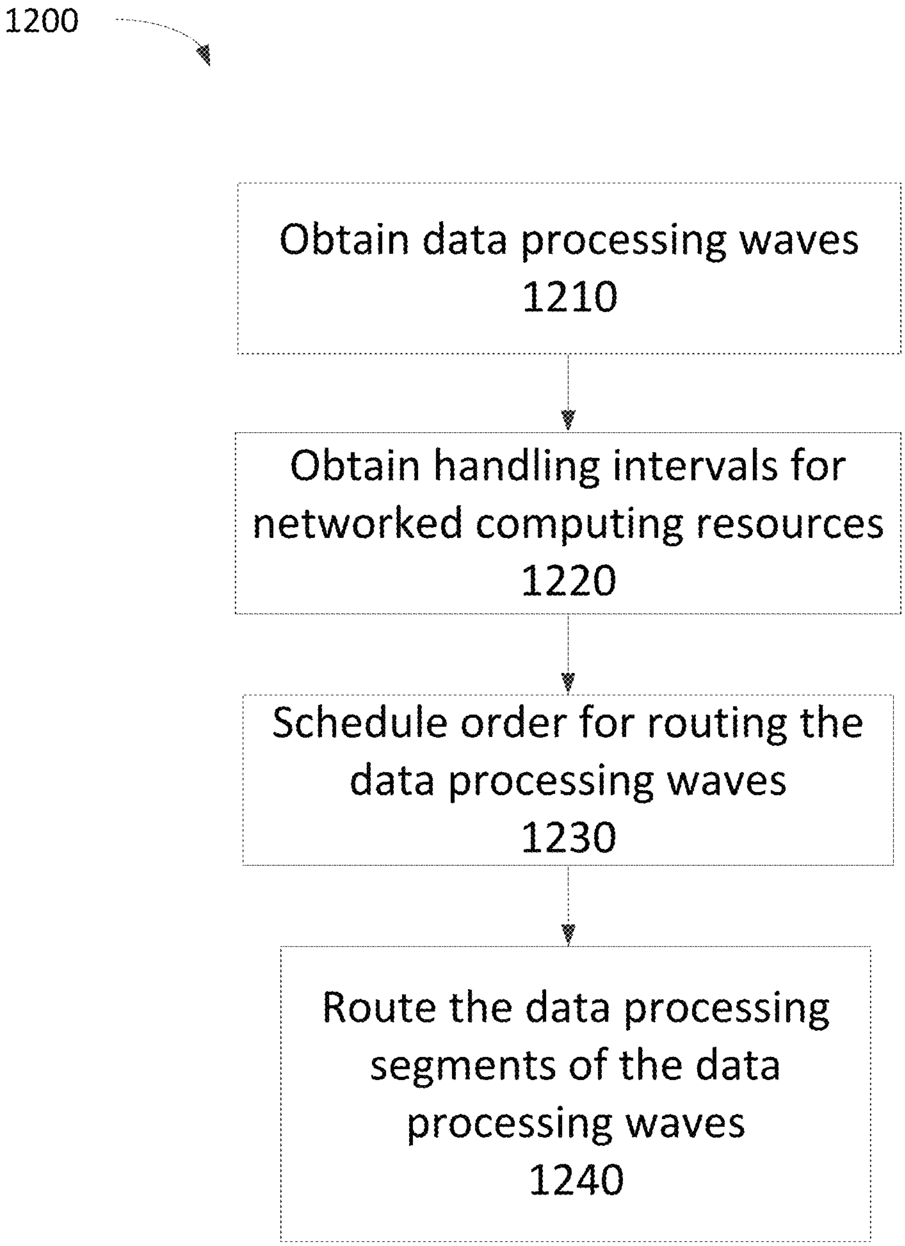

FIG. 12 is a flowchart showing aspects of an example method 1200 for coordinating processing of data by multiple networked computing resources. At 1210, processors obtain data processing waves from a wave or session queue. The data processing waves identify one or more data processing segments and corresponding networked computing resource to which each of the data processing segments are to be routed. The data processing waves also identify a timing sequence in which the one or more data processing segments are to be routed.

At 1220, the processors obtain minimum handling intervals for each of the networked computing resources. In some embodiments, the handling intervals can be based on the monitored data associated with the networked computing resources.

At 1230, the processors schedule an order for routing the data processing waves based on the wave timing sequences and the handling intervals for the networked computing resources. In some embodiments, scheduling the order comprises determining an order which intersperses the data processing segments of different data processing waves without violating the networked computing resource handling intervals and without violating the timing sequences of the data processing waves.

In some examples, the timing sequences can include acceptable time ranges within which one data processing segment can be routed relative to the time for routing a second data processing segment. In some embodiments, scheduling an order for routing data processing waves can include adjusting a routing time sequence for one or more wave within these time ranges.

In some embodiments, the processors are configured to obtain M data processing waves from a wave queue, and to determine a total handling time for each possible arrangement of the M data processing waves. The processors then schedule the order based on the arrangement having the shortest total handling time.

In some embodiments, the processors consider additional parameters. For example, when a choice is available, the processor can be configured to select an arrangement which uses the fewest number of networked computing resource (venue) sessions. In another example, the processors can consider whether different data processing segments are trade requests are for the same financial interest, and may select an arrangement to avoid or reduce any conflicts. Other similar factors include order sizes, prices, parties to a trade, etc.

The selection of the number of data processing waves M may be dependent on the amount of time required to evaluate all the order arrangements for the M waves versus the total handling time required by the order wave processor to route a wave. If the evaluation time is too high, it can become a bottleneck and waste routing resources by allowing them to idle while the evaluation is being performed. This also can increase the amount of time during which the prices or liquidity at the networked computing resources may change thereby potentially reducing capture ratios. If M is too small, routing resources may be waste because there may be less opportunity to optimizing the scheduling of the waves.

In some examples, the number of waves M can be selected dynamically as resources and/or wave handling times change.

In some embodiments, the processors compute as many of the possible arrangements for the M waves that can be evaluated before a time limit expires. Once the time limit expires, the best schedule from the evaluated arrangements is selected.

In some embodiments, the processors are configured to select and schedule M waves from the wave queue. However, only the first W waves from the scheduled order are routed while the remaining M-W waves in the schedule and the next W waves in the wave queue are evaluated to determine a next scheduling order.

In some embodiments, the system route one scheduled order of waves (or a subset of the order) while concurrent computing the schedule for the next order. This pipelining of the process can, in some examples, lead to improved performance.

In some examples, the selection of waves from the wave queue and/or session queues may be based on one or more priority schemes. These schemes can include batches, round robins, first-in first one, etc. In some embodiments, the priority scheme is based on meeting regulatory requirements. In some examples, the priority scheme includes rules based on financial interest symbols, order sizes, prices, priorities, clients, pricing schemes, contractual obligations, etc.

In some embodiments, the selection of waves from a queue may be based on the total routing/handling time for the particular wave. For example, if a wave has tight timing parameters (i.e. small delays between data processing segments, and therefore a shorter handling time), it may be prioritized over a wave having a longer handling time if it can easily fit in a next schedule or otherwise result in higher throughput.

At 850, the system routes each of the data processing segments in the ordered data processing waves based on the schedule.

As described herein, the processors monitor data associated with the networked computing resources. In some embodiments, the processors obtain a minimum handling interval time by identifying with the monitored data when two or more data processing segments routed to the same networked computing resource resulted in one or more latencies which are longer than a historical latency value for the networked computing resource. The difference in time between the involved data processing segments can be used to define a minimum handling time for the networked computing resource. In some examples, the longer latency may be indicative that one of the data processing segments was queued at the networked computing resource (or along the path).

Similarly, in some embodiments, the processors can identify a number of data processing segments that can be typically routed to the same networked computing resource within a minimum handling time before a longer than typical latency is observed. In some examples, this number may be indicative with a number of processors, etc. at a networked computing resource that must be busy before a subsequent request is queued.

In some embodiments, when the monitored data (e.g. latency, capture ratio) indicates that a networked computing resource (or route) is congested, the processors can delay, reschedule or re-prepare any wave that has at least one data processing segment for routing to the affected networked computing resource.

In some embodiments, monitoring the data includes identifying in various data processing segments from the scheduled wave orders which are to be routed to the same destination or otherwise have the potential to act as a good test case to determine timing parameters, handling times, congestion thresholds, etc. In some examples, by identifying and specifically monitoring these data processing segments with test capabilities, the system may, in some instances reduce the need to send test data processing segments.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A system for coordinating processing of data by multiple networked computing resources, the system comprising at least one processor configured to:
- receive from one or more data sources signals representing instructions for execution of at least one data process executable by a plurality of networked computing resources, the at least one data process representing at least one proposed trade in a financial interest;
- obtain data providing an indication of available market resources at each of the plurality of networked computing resources, the available market resources for satisfying requirements for execution of at least a portion of the at least one data process;
- based on the data providing the indication of available market resources:
  - divide the at least one data process into a plurality of data processing segments, each data processing segment to be routed to at least one of the plurality of networked computing resources;
  - determine a plurality of timing parameters, each of the plurality of timing parameters to be associated with a corresponding one of the plurality of data processing segments, the plurality of timing parameters determined to cause synchronized execution of the plurality of data processing segments by the plurality of networked computing resources;
  - based on the timing parameters and networked computing processors associated with each of the plurality of data processes, determine a timing sequence for routing the data processing segments for all of the plurality of data processes; and
- route the plurality of data processing segments to the plurality of corresponding networked computing resources based on the timing sequence.

2. The system of claim 1 wherein obtaining the data providing an indication of available market resources at each of the plurality of networked computing resources comprises:
- receiving first market resource data from a first source, the first market resource data identifying market resources communicated as available for satisfying requirements for execution of at least a portion of the at least one data process at a first subset of the plurality of networked computing resources; and receiving second market resource data from a second source, the second market resource data identifying market resources communicated as potentially available for satisfying requirements for execution of at least a portion of the at least one data process at a second subset of the plurality of networked computing resources.

3. The system of claim 2, wherein the first market resource data comprises data made available via a public source; and the second market resource data comprises data identifying market resources associated with an electronic liquidity provider which is communicated via a non-public source.

4. The system of claim 2, wherein the first market resource data includes data fields associated with every requirement for execution of at least the portion of the at least one data process at the first subset of the plurality of networked computing resources; and the second market resource data includes data fields associated with at subset of the requirements for execution of at least the portion of the at least one data process at the second subset of the plurality of networked computing resources.

5. The system of claim 2, wherein the second market resource data is received from one or more systems associated with an electronic liquidity provider or single dealer platform.

6. The system of claim 2, wherein dividing the at least one data process into the plurality of data processing segments comprises: generating a first data processing segment for routing to one of the second subset of the plurality of networked computing resources, wherein the first data processing segment includes a request quantity which is smaller than a quantity communicated as being potentially available in the second market resource data.

7. The system of claim 6, wherein the request quantity is between 10% and 35% of the quantity communicated as being potentially available in the second market resource data.

8. The system of claim 2, wherein dividing the at least one data process into the plurality of data processing segments comprises prioritizing utilization of resource quantities communicated as being potentially available at the second subset of the plurality of networked computing resources over utilization of resource quantities communicated as available at the first subset of the plurality of networked computing resources.

9. The system of claim 2, wherein dividing the at least one data process into the plurality of data processing segments comprises: generating a first data processing segment for routing to one of the second subset of the plurality of networked computing resources only when resource quantities communicated as being potentially available at the second subset of the plurality of networked computing resources are larger than resource quantities communicated as available at the first subset of the plurality of networked computing resources.

10. The system of claim 2, comprising: monitoring data associated with data processing segments previously routed to the second subset of networked computing resources; and wherein dividing the at least one data process into the plurality of data processing segments, or determining the plurality of timing parameters is based on the monitored data.

11. The system of claim 10, wherein when the monitored data indicates that timing parameters associated with the data processing segments previously routed to the second subset of networked computing resources are not correlated to successful completion of related data processing segments previously routed to the first subset of networked computing resources, the at least one processor is configured to: prioritize utilization of resource quantities communicated as being potentially available at the second subset of the plurality of networked computing resources over utilization of resource quantities communicated as available at the first subset of the plurality of networked computing resources.

12. The system of claim 11, wherein prioritizing the utilization of the resource quantities communicated as being potentially available at the second subset of the plurality of networked computing resources comprises: generating timing parameters for the data processing segments to be routed to the second subset of the plurality of networked computing resources with larger timing variances relative to the timing parameters for the data processing segments to be routed to the first subset of the plurality of networked computing resources.

13. The system of claim 1, wherein the at least one processor is configured to: generate the plurality of data processing segments based on FIX messages using a pre-generated sequence numbers stored in memory mapped files.

14. The system of claim 1, wherein the at least one processor is configured to: generate the plurality of data processing segments using pre-generated serialized message headers.

15. A method for coordinating processing of data by multiple networked computing resources, the method comprising:

receiving from one or more data sources signals representing instructions for execution of at least one data process executable by a plurality of networked computing resources, the at least one data process representing at least one proposed trade in a financial interest;

obtaining data providing an indication of available market resources at each of the plurality of networked computing resources, the available market resources for satisfying requirements for execution of at least a portion of the at least one data process;

based on the data providing the indication of available market resources:

dividing the at least one data process into a plurality of data processing segments, each data processing segment to be routed to at least one of the plurality of networked computing resources;

determining a plurality of timing parameters, each of the plurality of timing parameters to be associated with a corresponding one of the plurality of data processing segments, the plurality of timing parameters determined to cause synchronized execution of the plurality of data processing segments by the plurality of networked computing resources;

based on the timing parameters and networked computing processors associated with each of the plurality of data processes, determining a timing sequence for routing the data processing segments for all of the plurality of data processes; and routing the plurality of data processing segments to the plurality of corresponding networked computing resources based on the timing sequence.

16. The method of claim 15 wherein obtaining the data providing an indication of available market resources at each of the plurality of networked computing resources comprises:

receiving first market resource data from a first source, the first market resource data identifying market resources communicated as available for satisfying requirements for execution of at least a portion of the at least one data process at a first subset of the plurality of networked computing resources; and receiving second market resource data from a second source, the second market resource data identifying market resources communicated as potentially available for satisfying requirements for execution of at least a portion of the at least one data process at a second subset of the plurality of networked computing resources.

17. The method of claim 16, wherein the first market resource data comprises data made available via a public source; and the second market resource data comprises data identifying market resources associated with an electronic liquidity provider which is communicated via a non-public source.

18. The method of claim 16, wherein the first market resource data includes data fields associated with every requirement for execution of at least the portion of the at least one data process at the first subset of the plurality of networked computing resources; and the second market resource data includes data fields associated with at subset of the requirements for execution of at least the portion of the at least one data process at the second subset of the plurality of networked computing resources.

19. The method of claim 16, wherein the second market resource data is received from one or more systems associated with an electronic liquidity provider or single dealer platform.

20. The method of claim 16, wherein dividing the at least one data process into the plurality of data processing segments comprises: generating a first data processing segment for routing to one of the second subset of the plurality of networked computing resources, wherein the first data processing segment includes a request quantity which is smaller than a quantity communicated as being potentially available in the second market resource data.

21. The method of claim 20, wherein the request quantity is between 10% and 35% of the quantity communicated as being potentially available in the second market resource data.

22. The method of claim 16, wherein dividing the at least one data process into the plurality of data processing segments comprises prioritizing utilization of resource quantities communicated as being potentially available at the second subset of the plurality of networked computing resources over utilization of resource quantities communicated as available at the first subset of the plurality of networked computing resources.

23. The method of claim 16, wherein dividing the at least one data process into the plurality of data processing segments comprises: generating a first data processing segment for routing to one of the second subset of the plurality of networked computing resources only when resource quantities communicated as being potentially available at the second subset of the plurality of networked computing resources are larger than resource quantities communicated as available at the first subset of the plurality of networked computing resources.

24. The method of claim 16, comprising: monitoring data associated with data processing segments previously routed to the second subset of networked computing resources; and wherein dividing the at least one data process into the plurality of data processing segments, or determining the plurality of timing parameters is based on the monitored data.

25. The method of claim 24, comprising when the monitored data indicates that timing parameters associated with the data processing segments previously routed to the second subset of networked computing resources are not correlated to successful completion of related data processing segments previously routed to the first subset of networked computing resources, prioritizing utilization of resource quantities communicated as being potentially available at the second subset of the plurality of networked computing resources over utilization of resource quantities communicated as available at the first subset of the plurality of networked computing resources.

26. The method of claim 25, wherein prioritizing the utilization of the resource quantities communicated as being potentially available at the second subset of the plurality of networked computing resources comprises: generating timing parameters for the data processing segments to be routed to the second subset of the plurality of networked computing resources with larger timing variances relative to the timing parameters for the data processing segments to be routed to the first subset of the plurality of networked computing resources.

27. The method of claim 15, comprising: generating the plurality of data processing segments based on FIX messages using a pre-generated sequence numbers stored in memory mapped files.

28. The method of claim 15, comprising: generating the plurality of data processing segments using pre-generated serialized message headers.

29. A non-transitory, computer-readable medium or media having stored thereon computer-executable instructions which when executed by at least one processors, configure the at least one processor for:

receiving from one or more data sources signals representing instructions for execution of at least one data process executable by a plurality of networked computing resources, the at least one data process representing at least one proposed trade in a financial interest;

obtaining data providing an indication of available market resources at each of the plurality of networked computing resources, the available market resources for satisfying requirements for execution of at least a portion of the at least one data process;

based on the data providing the indication of available market resources:

dividing the at least one data process into a plurality of data processing segments, each data processing segment to be routed to at least one of the plurality of networked computing resources;

determining a plurality of timing parameters, each of the plurality of timing parameters to be associated with a corresponding one of the plurality of data processing segments, the plurality of timing parameters determined to cause synchronized execution of the plurality of data processing segments by the plurality of networked computing resources;

based on the timing parameters and networked computing processors associated with each of the plurality of data processes, determining a timing sequence for routing the data processing segments for all of the plurality of data processes; and routing the plurality of data processing segments to the plurality of corresponding networked computing resources based on the timing sequence.

* * * * *